(12) United States Patent
Zhao et al.

(10) Patent No.: US 12,513,397 B2
(45) Date of Patent: Dec. 30, 2025

(54) CAMERA MODULE HAVING DRIVING ASSEMBLY

(71) Applicant: NINGBO SUNNY OPOTECH CO., LTD, Zhejiang (CN)

(72) Inventors: Bojie Zhao, Yuyao (CN); Linmin Ye, Yuyao (CN); Jiayao Que, Yuyao (CN); Yinli Fang, Yuyao (CN); Zhen Huang, Yuyao (CN); Qiang Fu, Yuyao (CN); Chao Hong, Yuyao (CN); Dongli Yuan, Yuyao (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 54 days.

(21) Appl. No.: 18/288,230

(22) PCT Filed: Apr. 12, 2022

(86) PCT No.: PCT/CN2022/086337
§ 371 (c)(1),
(2) Date: Oct. 25, 2023

(87) PCT Pub. No.: WO2022/228112
PCT Pub. Date: Nov. 3, 2022

(65) Prior Publication Data
US 2024/0205547 A1     Jun. 20, 2024

(30) Foreign Application Priority Data

Apr. 26, 2021  (CN) .......................... 202110454537.5
Apr. 26, 2021  (CN) .......................... 202110455905.8

(51) Int. Cl.
*H04N 23/68*     (2023.01)
*H04N 23/54*     (2023.01)
*H04N 23/55*     (2023.01)

(52) U.S. Cl.
CPC .......... *H04N 23/687* (2023.01); *H04N 23/54* (2023.01); *H04N 23/55* (2023.01)

(58) Field of Classification Search
CPC ...... H04N 23/687; H04N 23/54; H04N 23/55; H04N 23/57; G02B 27/646;
(Continued)

(56) References Cited

U.S. PATENT DOCUMENTS 8,179,447 B2 * 5/2012 Irisawa ................... H04N 23/54
                                                              348/208.7
9,081,203 B2 * 7/2015 Shin ...................... G02B 27/646
(Continued)

FOREIGN PATENT DOCUMENTS

CN       201477278 U    5/2010
CN       202837765 U    3/2013
(Continued)

OTHER PUBLICATIONS

European Search Report for European Application No. 22794583.9, dated Aug. 14, 2024.
(Continued)

*Primary Examiner* — Padma Haliyur
(74) *Attorney, Agent, or Firm* — Birch, Stewart, Kolasch & Birch, LLP

(57) ABSTRACT

Disclosed is a camera module, which uses a new piezoelectric actuator as a driving element to meet the driving requirement of the camera module. Specifically, the camera module uses the new piezoelectric actuator as the driving element to move an optical camera lens for optical image stabilization. Moreover, the piezoelectric actuator is arranged in the camera module in a rational arrangement scheme, so as to meet both the structural design requirement and the dimensional design requirement of the camera module.

17 Claims, 13 Drawing Sheets

(58) Field of Classification Search
CPC .... G03B 2205/0015; G03B 2205/0061; G03B 5/02; G03B 30/00
See application file for complete search history.

(56) References Cited

U.S. PATENT DOCUMENTS

| | | | |
|---|---|---|---|
| 10,367,432 B2 | 7/2019 | Takahashi | |
| 2010/0171392 A1 | 7/2010 | Mukae | |
| 2010/0309323 A1 | 12/2010 | Shin et al. | |
| 2012/0127576 A1* | 5/2012 | Tanaka | G02B 27/646 359/557 |
| 2016/0147035 A1* | 5/2016 | Lee | H02N 2/101 359/824 |
| 2016/0161828 A1 | 6/2016 | Lee | |
| 2017/0017058 A1 | 1/2017 | Sumioka | |
| 2017/0163176 A1 | 6/2017 | Tsuchiya et al. | |
| 2017/0257544 A1 | 9/2017 | Hsu et al. | |
| 2019/0289180 A1 | 9/2019 | Wang | |
| 2019/0346740 A1* | 11/2019 | Suh | G03B 5/00 |

FOREIGN PATENT DOCUMENTS

| | | |
|---|---|---|
| CN | 206611500 U | 11/2017 |
| CN | 107783241 A | 3/2018 |
| CN | 111262471 A | 6/2020 |
| CN | 111474671 A | 7/2020 |
| CN | 111578079 A | 8/2020 |
| CN | 211531170 U | 9/2020 |
| CN | 112492175 A | 3/2021 |
| CN | 112672028 A | 4/2021 |
| CN | 212935798 U | 4/2021 |
| JP | 2011-227427 A | 11/2011 |
| WO | WO 2021/017683 A1 | 2/2021 |

OTHER PUBLICATIONS

International Search Report (PCT/ISA/210), issued in PCT/CN2022/086337, dated Jul. 6, 2022.

* cited by examiner

CAMERA MODULE HAVING DRIVING ASSEMBLY

CROSS REFERENCE TO RELATED APPLICATIONS

This application is a national stage application under 35 U.S.C. § 371 to International PCT Application PCT/CN2022/086337, entitled "CAMERA MODULE", filed Apr. 12, 2022, which claims priority to and benefit of China Patent Application No. 202110454537.5, filed Apr. 26, 2021, and China Patent Application No. 202110455905.8, filed Apr. 26, 2021. All of the above-referenced applications are incorporated into the present application by reference herein in their entirety.

TECHNICAL FIELD

The present disclosure relates to a camera module, and in particular, to a camera module which uses a new piezoelectric actuator as a driving element to meet the driving requirement of the camera module. Specifically, the camera module uses the new piezoelectric actuator as the driving element to move an optical camera lens for optical image stabilization. Moreover, the piezoelectric actuator is arranged in the camera module in a rational arrangement scheme, so as to meet both the structural design requirement and the dimensional design requirement of the camera module.

TECHNICAL BACKGROUND

With the popularity of mobile electronic devices, the related technologies of camera modules for helping users obtain images (such as, videos or images) used in the mobile electronic devices have been developed and advanced rapidly, and in recent years, the camera modules have been widely applied in many fields such as medical treatment, security and industrial production.

In order to meet the increasingly widespread market demands, high pixels, large chips and small sizes are irreversible development trends of the existing camera modules. With the development of photosensitive chips in the direction of high pixels and large chips, the size of optical components (such as filter elements, and optical camera lenses) that are compatible with photosensitive chips is also gradually increasing, which brings new challenges to driving elements used to drive the optical components for optical performance adjustment (e.g., optical focus, optical image stabilization, etc.).

Specifically, existing driving elements for driving optical components are electromagnetic motors, such as Voice Coil Motors (VCM), Shape Memory Alloy Actuators (SMA), etc. However, as the size of optical components increases, resulting in an increase in weight, the existing electromagnetic motors are gradually unable to provide sufficient driving force to drive the optical components to move. Quantitatively, existing voice coil motors and shape memory alloy drivers are only suitable for driving an optical component with a weight less than 100 mg. That is, if the weight of the optical camera lens exceeds 100 mg, the existing drivers will not be able to meet the application requirements of camera modules.

In addition, as mobile terminal equipment develops in the direction of miniaturization and thinness, the density of component layout inside the driving element has also increased. Correspondingly, the existing voice coil motor is internally provided with a coil and magnets. When the distance between two magnets is too close (less than 7 mm), their internal magnetic fields will interact with each other, resulting in displacement or vibration of the magnets, and reducing the stability of its drive control.

Therefore, an adapted new driving solution for camera modules is needed. The new driver can not only meet the driving requirements of the camera module for optical performance adjustment, but also meet the development requirements of lightness and thinness of the camera module.

SUMMARY

An advantage of the present disclosure is to provide a camera module, wherein the camera module uses a new piezoelectric actuator as a driving element so that it can not only provide sufficient driving force, but also provide driving performance with higher accuracy and a longer stroke, so as to meet the demands of the camera module for optical performance adjustment, for example, the demands for optical image stabilization.

Another advantage of the present disclosure is to provide a camera module, wherein the piezoelectric actuator has a relatively small size to better adapt to the development tendency of the camera modules for lightness and thinness.

Another advantage of the present disclosure is to provide a camera module, wherein the piezoelectric actuator is arranged in the camera module in a rational arrangement scheme to meet the structure and size requirements of the camera module.

Through the following description, other advantages and features of the present disclosure will become apparent, and can be realized by means and combinations particularly pointed out in the claims.

In order to achieve at least one of the advantages described above, the present disclosure provides a camera module, comprising:
  a photosensitive assembly, comprising a circuit board and a photosensitive chip electrically connected to the circuit board;
  a frame carrier assembly mounted on the photosensitive assembly, comprising a first frame carrier, a second frame carrier externally arranged on the first frame carrier, and an outer frame carrier externally arranged on the second frame carrier;
  an optical camera lens held on a photosensitive path of the photosensitive assembly in such a manner that it is mounted in the first frame carrier of the frame assembly, wherein the optical camera lens is provided with an optical axis; and
  a driving assembly, comprising a first driving element, a first prepressing component, a second driving element and a second prepressing component, the first driving element being designed as a piezoelectric actuator, wherein the first driving element is abutted against the first frame carrier in a frictional contact manner through the first prepressing component, and is configured to drive the first frame carrier so as to bring the optical camera lens to move in a plane perpendicular to the optical axis for optical image stabilization in a first direction; wherein the second driving element is abutted against the second frame carrier in a frictional contact manner through the second prepressing component, and is configured to drive the second frame carrier so as to bring the first frame carrier to bring the optical camera lens to move in a plane perpendicular to the optical axis for optical image stabilization in a second direction, the first direction being perpendicular to the second direction.

In the camera module according to the present disclosure, the friction traveling wave or standing wave piezoelectric motor comprises: a piezoelectric active portion and a friction driving portion that is driveably connected to the piezoelectric active portion, wherein after the piezoelectric actuator is turned on, the friction driving portion is configured to provide a driving force for driving the first frame carrier or the second frame carrier under the action of the piezoelectric active portion.

In the camera module according to the present disclosure, the piezoelectric active portion has multiple sets of first polarization regions and second polarization regions alternately arranged, and the first polarization region and the second polarization region have opposite polarization directions, wherein after the piezoelectric actuator is turned on, the multiple sets of first polarization regions and second polarization regions alternately arranged deform in different directions to bring the friction driving portion to move in a traveling wave or standing wave manner along a preset direction, so as to provide a driving force for driving the first frame carrier or the second frame carrier.

In the camera module according to the present disclosure, the piezoelectric active portion has multiple sets of first polarization regions and second polarization regions alternately arranged, and the first polarization region and the second polarization region have a same polarization direction, wherein after the piezoelectric actuator is turned on, the multiple sets of first polarization regions and second polarization regions alternately arranged deform in different directions to bring the friction driving portion to move in a traveling wave or standing wave manner along a preset direction, so as to provide a driving force for driving the first frame carrier or the second frame carrier.

In the camera module according to the present disclosure, the multiple sets of first polarization regions and second polarization regions alternately arranged are on a same straight line.

In the camera module according to the present disclosure, the friction driving portion comprises a plurality of friction driving elements spaced apart from each other, and a first end of each of the friction driving elements is coupled to the piezoelectric active portion.

In the camera module according to the present disclosure, the plurality of friction driving elements are located in a middle region of the piezoelectric active portion.

In the camera module according to the present disclosure, the piezoelectric actuator further comprises a friction connection layer stacked on the piezoelectric active portion, and each of the friction driving elements is coupled to the piezoelectric active portion in such a manner that its first end is fixed to the friction connection layer.

In the camera module according to the present disclosure, a plurality of end faces of the plurality of friction driving elements at a second end opposite to the first end are on a same plane.

In the camera module according to the present disclosure, the driving assembly further comprises a first friction actuating portion and a second friction actuating portion, the first friction actuating portion is arranged between the first driving element and the first frame carrier, and the second friction actuating portion is arranged between the second driving element and the second frame carrier.

In the camera module according to the present disclosure, the first friction actuating portion has a first surface and a second surface opposite to the first surface, the first surface is in contact with a surface of the first frame carrier, and the second surface is in contact with an end surface of at least one of the plurality of friction driving elements at the second end; and the second friction actuating portion has a third surface and a fourth surface opposite to the third surface, the third surface is in contact with a surface of the second frame carrier, and the fourth surface is in contact with an end surface of at least one of the plurality of friction driving elements at the second end.

In the camera module according to the present disclosure, the piezoelectric actuator has a length dimension less than or equal to 10 mm, a width dimension less than or equal to 1 mm, and a height dimension less than or equal to 1 mm.

In the camera module according to the present disclosure, the first driving element is sandwiched between the first frame carrier and the second frame carrier through the first prepressing component and the first friction actuating portion, so that the first driving element is abutted against the first frame carrier in a frictional contact manner.

In the camera module according to the present disclosure, the first driving element is located on a side part of the first frame carrier.

In the camera module according to the present disclosure, the first driving element is located on an upper part of the first frame carrier.

In the camera module according to the present disclosure, the first driving element is located on a lower part of the first frame carrier.

In the camera module according to the present disclosure, the second driving element is sandwiched between the second frame carrier and the outer frame carrier through the second prepressing component and the second friction actuating portion, so that the second driving element is abutted against the second frame carrier in a frictional contact manner, and wherein the second driving element is located on a side part of the second frame carrier.

In the camera module according to the present disclosure, the second driving element is sandwiched between the second frame carrier and the lens carrier through the second prepressing component and the second friction actuating portion, so that the second driving element is abutted against the second frame carrier in a frictional contact manner, and wherein the second driving element is located on an upper part of the second frame carrier.

In the camera module according to the present disclosure, the driving assembly further comprises an outer frame carrier externally arranged on the second frame carrier, wherein the second driving element is sandwiched between the second frame carrier and the outer frame carrier through the second prepressing component and the second friction actuating portion, so that the second driving element is abutted against the second frame carrier in a frictional contact manner, and wherein the second driving element is located on a low part of the second frame carrier.

In the camera module according to the present disclosure, the driving assembly further comprises a first guiding mechanism arranged between the first frame carrier and the second frame carrier, and a second guiding mechanism arranged between the second frame carrier and the outer frame carrier.

In the camera module according to the present disclosure, the driving assembly further comprises a first guiding mechanism arranged between the first frame carrier and the second frame carrier, and a second guiding mechanism between the second frame carrier and the lens carrier.

In the camera module according to the present disclosure, the driving assembly further comprises a first guiding mechanism arranged between the first frame carrier and the second frame carrier, and a second guiding mechanism arranged between the second frame carrier and the outer frame carrier.

In the camera module according to the present disclosure, the first prepressing component comprises a first elastic element, and the first elastic element is arranged between the piezoelectric active portion of the first driving element and the second frame carrier, so as to force the first driving element to abut against the first frame carrier in a frictional contact manner through an elastic force of the first elastic element; and the second prepressing element comprises a second elastic element, and the second elastic element is arranged between the piezoelectric active portion of the second driving element and the outer frame carrier, so as to force the second driving element to abut against the second frame carrier in a frictional contact manner through an elastic force of the second elastic element.

In the camera module according to the present disclosure, the first prepressing component comprises a first elastic element, and the first elastic element is arranged between the piezoelectric active portion of the first driving element and the second frame carrier, so as to force the first driving element to abut against the first frame carrier in a frictional contact manner through an elastic force of the first elastic element; and the second prepressing element comprises a second elastic element, and the second elastic element is arranged between the piezoelectric active portion of the second driving element and the lens carrier, so as to force the second driving element to abut against the second frame carrier in a frictional contact manner through an elastic force of the second elastic element.

In the camera module according to the present disclosure, the first prepressing component comprises a first elastic element, and the first elastic element is arranged between the piezoelectric active portion of the first driving element and the second frame carrier, so as to force the first driving element to abut against the first frame carrier in a frictional contact manner through an elastic force of the first elastic element; and the second prepressing element comprises a second elastic element, and the second elastic element is arranged between the piezoelectric active portion of the second driving element and the outer frame carrier, so as to force the second driving element to abut against the second frame carrier in a frictional contact manner through an elastic force of the second elastic element.

In the camera module according to the present disclosure, the first elastic element and the second elastic element are designed as adhesives having elasticity.

In the camera module according to the present disclosure, thickness dimensions of the first elastic element and the second elastic element are between 10 um and 50 um.

In the camera module according to the present disclosure, the first prepressing component comprises a first magnetic attraction element arranged on the first frame carrier and a second magnetic attraction element arranged on the second frame carrier and corresponding to the first magnetic attraction element, as so to force the first driving element to abut against the first frame carrier in a frictional contact manner through an magnetic attraction action between the first magnetic attraction element and the second magnetic attraction element; and the second prepressing component comprises a third magnetic attraction element arranged on the second frame carrier and a fourth magnetic attraction element arranged on the outer frame carrier and corresponding to the third magnetic attraction element, as so to force the second driving element to abut against the second frame carrier in a frictional contact manner through an magnetic attraction action between the third magnetic attraction element and the fourth magnetic attraction element.

In the camera module according to the present disclosure, the first prepressing component comprises a first magnetic attraction element arranged on the first frame carrier and a second magnetic attraction element arranged on the second frame carrier and corresponding to the first magnetic attraction element, as so to force the first driving element to abut against the first frame carrier in a frictional contact manner through an magnetic attraction action between the first magnetic attraction element and the second magnetic attraction element; and the second prepressing component comprises a third magnetic attraction element arranged on the second frame carrier and a fourth magnetic attraction element arranged on the lens carrier and corresponding to the third magnetic attraction element, as so to force the first driving element to abut against the first frame carrier in a frictional contact manner through an magnetic attraction action between the first magnetic attraction element and the second magnetic attraction element.

In the camera module according to the present disclosure, the first prepressing component comprises a first magnetic attraction element arranged on the first frame carrier and a second magnetic attraction element arranged on the second frame carrier and corresponding to the first magnetic attraction element, as so to force the first driving element to abut against the first frame carrier in a frictional contact manner through an magnetic attraction action between the first magnetic attraction element and the second magnetic attraction element; and the second prepressing component comprises a third magnetic attraction element arranged on the second frame carrier and a fourth magnetic attraction element arranged on the outer frame carrier and corresponding to the third magnetic attraction element, as so to force the second driving element to abut against the second frame carrier in a frictional contact manner through an magnetic attraction action between the third magnetic attraction element and the fourth magnetic attraction element.

According to still another aspect of the present disclosure, a camera module is further provided, comprising:

a photosensitive assembly, comprising a circuit board and a photosensitive chip electrically connected to the circuit board;

a lens assembly held on a photosensitive path of the photosensitive assembly, comprising a lens carrier and an optical camera lens mounted on the lens carrier, wherein the optical camera lens is provided with an optical axis; and a driving assembly, comprising a first carrying frame, a first driving element and a first prepressing component, wherein the photosensitive assembly is mounted on the first carrying frame, and the first driving element is designed as a piezoelectric actuator, and wherein the first driving element is abutted against the first carrying frame in a frictional contact manner through the first prepressing component, and is configured to drive the first carrying frame so as to bring the photosensitive assembly to move in a plane perpendicular to the optical axis for optical image stabilization.

In the camera module according to the present disclosure, the driving assembly further comprises a second carrying frame, a second driving element and a second prepressing component, wherein the second carrying frame is externally arranged on the first carrying frame, and the second driving element is designed as a piezoelectric actuator, and wherein the second driving element is abutted against the second carrying frame in a frictional contact manner through the second prepressing component, and is configured to drive the second carrying frame so as to bring the first carrying frame to bring the photosensitive assembly to move in a plane perpendicular to the optical axis for optical image stabilization.

In the camera module according to the present disclosure, the piezoelectric actuator comprises a piezoelectric active portion and a friction driving portion that is driveably connected to the piezoelectric active portion, wherein after the piezoelectric actuator is turned on, the friction driving portion is configured to provide a driving force for driving the first carrying frame or the second carrying frame under the action of the piezoelectric active portion.

In the camera module according to the present disclosure, the piezoelectric active portion has multiple sets of first polarization regions and second polarization regions alternately arranged, and the first polarization region and the second polarization region have opposite polarization directions, wherein after the piezoelectric actuator is turned on, the multiple sets of first polarization regions and second polarization regions alternately arranged deform in different directions to bring the friction driving portion to move in a traveling wave or standing wave manner along a preset direction, so as to provide a driving force for driving the first carrying frame or the second carrying frame.

In the camera module according to the present disclosure, the friction driving portion comprises a plurality of friction driving elements spaced apart from each other, and a first end of each of the friction driving elements is coupled to the piezoelectric active portion.

In the camera module according to the present disclosure, the piezoelectric actuator further comprises a friction connection layer stacked on the piezoelectric active portion, and each of the friction driving elements is coupled to the piezoelectric active portion in such a manner that its first end is fixed to the friction connection layer.

In the camera module according to the present disclosure, a plurality of end faces of the plurality of friction driving elements at a second end opposite to the first end are on a same plane.

In the camera module according to the present disclosure, the driving assembly further comprises a first friction actuating portion and a second friction actuating portion, the first friction actuating portion is arranged between the first driving element and the first carrying frame, and the second friction actuating portion is arranged between the second driving element and the second carrying frame.

In the camera module according to the present disclosure, the first friction actuating portion has a first surface and a second surface opposite to the first surface, the first surface is in contact with a surface of the first carrying frame, and the second surface is in contact with an end surface of at least one of the plurality of friction driving elements at the second end; and the second friction actuating portion has a third surface and a fourth surface opposite to the third surface, the third surface is in contact with a surface of the second carrying frame, and the fourth surface is in contact with an end surface of at least one of the plurality of friction driving elements at the second end.

In the camera module according to the present disclosure, the first carrying frame has a first groove recessedly formed on its surface, and the first friction actuating portion is arranged in the first groove; and/or the second carrying frame has a second groove recessedly formed on its surface, and the second friction actuating portion is arranged in the second groove.

In the camera module according to the present disclosure, the first groove and the second groove have a length dimension greater than that of the piezoelectric actuator, and the piezoelectric actuator has a width dimension less than or equal to those of the first groove and the second groove.

In the camera module according to the present disclosure, the piezoelectric actuator has a length dimension less than or equal to 20 mm, a width dimension less than or equal to 1 mm, and a height dimension less than or equal to 1 mm.

In the camera module according to the present disclosure, the first driving element is sandwiched between the first carrying frame and the second carrying frame through the first prepressing component and the first friction actuating portion, so that the first driving element is abutted against the first carrying frame in a frictional contact manner.

In the camera module according to the present disclosure, the first driving element is located on a side part of the first carrying frame.

In the camera module according to the present disclosure, the first driving element is located on an upper part of the first carrying frame.

In the camera module according to the present disclosure, the first driving element is located on a lower part of the first carrying frame.

In the camera module according to the present disclosure, the driving assembly further comprises an outer frame externally arranged on the second carrying frame, wherein the second driving element is sandwiched between the second carrying frame and the outer frame through the second prepressing component and the second friction actuating portion, so that the second driving element is abutted against the second carrying frame in a frictional contact manner, and wherein the second driving element is located on a side part of the second carrying frame.

In the camera module according to the present disclosure, the second driving element is sandwiched between the second carrying frame and the lens carrier through the second prepressing component and the second friction actuating portion, so that the second driving element is abutted against the second carrying frame in a frictional contact manner, and wherein the second driving element is located on an upper part of the second carrying frame.

In the camera module according to the present disclosure, the driving assembly further comprises an outer frame externally arranged on the second carrying frame, wherein the second driving element is sandwiched between the second carrying frame and the outer frame through the second prepressing component and the second friction actuating portion, so that the second driving element is abutted against the second carrying frame in a frictional contact manner, and wherein the second driving element is located on a low part of the second carrying frame.

In the camera module according to the present disclosure, the driving assembly further comprises a first guiding mechanism arranged between the first carrying frame and the second carrying frame, and a second guiding mechanism arranged between the second carrying frame and the outer frame.

In the camera module according to the present disclosure, the driving assembly further comprises a first guiding mechanism arranged between the first carrying frame and the second carrying frame, and a second guiding mechanism between the second carrying frame and the lens carrier.

In the camera module according to the present disclosure, the driving assembly further comprises a first guiding mechanism arranged between the first carrying frame and the second carrying frame, and a second guiding mechanism arranged between the second carrying frame and the outer frame.

In the camera module according to the present disclosure, the first prepressing component comprises a first elastic element, and the first elastic element is arranged between the piezoelectric active portion of the first driving element and the second carrying frame, so as to force the first driving element to abut against the first carrying frame in a frictional contact manner through an elastic force of the first elastic element; and the second prepressing element comprises a second elastic element, and the second elastic element is arranged between the piezoelectric active portion of the second driving element and the outer frame, so as to force the second driving element to abut against the second carrying frame in a frictional contact manner through an elastic force of the second elastic element.

In the camera module according to the present disclosure, the first prepressing component comprises a first elastic element, and the first elastic element is arranged between the piezoelectric active portion of the first driving element and the second carrying frame, so as to force the first driving element to abut against the first carrying frame in a frictional contact manner through an elastic force of the first elastic element; and the second prepressing element comprises a second elastic element, and the second elastic element is arranged between the piezoelectric active portion of the second driving element and the lens carrier, so as to force the second driving element to abut against the second carrying frame in a frictional contact manner through an elastic force of the second elastic element.

In the camera module according to the present disclosure, the first prepressing component comprises a first elastic element, and the first elastic element is arranged between the piezoelectric active portion of the first driving element and the second carrying frame, so as to force the first driving element to abut against the first carrying frame in a frictional contact manner through an elastic force of the first elastic element; and the second prepressing element comprises a second elastic element, and the second elastic element is arranged between the piezoelectric active portion of the second driving element and the outer frame, so as to force the second driving element to abut against the second carrying frame in a frictional contact manner through an elastic force of the second elastic element.

In the camera module according to the present disclosure, the first elastic element and the second elastic element are designed as adhesives having elasticity.

In the camera module according to the present disclosure, thickness dimensions of the first elastic element and the second elastic element are between 10 um and 50 um.

In the camera module according to the present disclosure, the first prepressing component comprises a first magnetic attraction element arranged on the first carrying frame and a second magnetic attraction element arranged on the second carrying frame and corresponding to the first magnetic attraction element, as so to force the first driving element to abut against the first carrying frame in a frictional contact manner through an magnetic attraction action between the first magnetic attraction element and the second magnetic attraction element; and the second prepressing component comprises a third magnetic attraction element arranged on the second carrying frame and a fourth magnetic attraction element arranged on the outer frame and corresponding to the third magnetic attraction element, as so to force the second driving element to abut against the second carrying frame in a frictional contact manner through an magnetic attraction action between the third magnetic attraction element and the fourth magnetic attraction element.

In the camera module according to the present disclosure, the first prepressing component comprises a first magnetic attraction element arranged on the first carrying frame and a second magnetic attraction element arranged on the second carrying frame and corresponding to the first magnetic attraction element, as so to force the first driving element to abut against the first carrying frame in a frictional contact manner through an magnetic attraction action between the first magnetic attraction element and the second magnetic attraction element; and the second prepressing component comprises a third magnetic attraction element arranged on the second carrying frame and a fourth magnetic attraction element arranged on the lens carrier and corresponding to the third magnetic attraction element, as so to force the first driving element to abut against the first carrying frame in a frictional contact manner through an magnetic attraction action between the first magnetic attraction element and the second magnetic attraction element.

In the camera module according to the present disclosure, the first prepressing component comprises a first magnetic attraction element arranged on the first carrying frame and a second magnetic attraction element arranged on the second carrying frame and corresponding to the first magnetic attraction element, as so to force the first driving element to abut against the first carrying frame in a frictional contact manner through an magnetic attraction action between the first magnetic attraction element and the second magnetic attraction element; and the second prepressing component comprises a third magnetic attraction element arranged on the second carrying frame and a fourth magnetic attraction element arranged on the outer frame and corresponding to the third magnetic attraction element, as so to force the second driving element to abut against the second carrying frame in a frictional contact manner through an magnetic attraction action between the third magnetic attraction element and the fourth magnetic attraction element.

Further objects and advantages of the present disclosure will be fully embodied through the understanding of the following description and the drawings.

These and other objects, characteristics and advantages of the present disclosure are fully embodied through the following detailed description, drawings and claims.

BRIEF DESCRIPTION OF THE DRAWINGS

The above and other objects, features, and advantages of the present disclosure will become more apparent from the detailed description of the embodiments of the present disclosure in conjunction with the drawings. The drawings, which are used to provide a further understanding of the embodiments of the present disclosure and constitute a part of the description, are used to explain the present disclosure together with the embodiments of the present disclosure, and do not constitute a limitation of the present disclosure. In the drawings, the same reference signs generally represent the same components or steps.

DETAILED DESCRIPTION OF THE EMBODIMENTS

Hereinafter, exemplary embodiments according to the present disclosure will be described in detail with reference to the drawings. Obviously, the described embodiments are only a part of the embodiments of the present disclosure, rather than all the embodiments of the present disclosure. It should be understood that the present disclosure is not limited by the exemplary embodiments described herein.

Exemplary Camera Module

Figure 1:
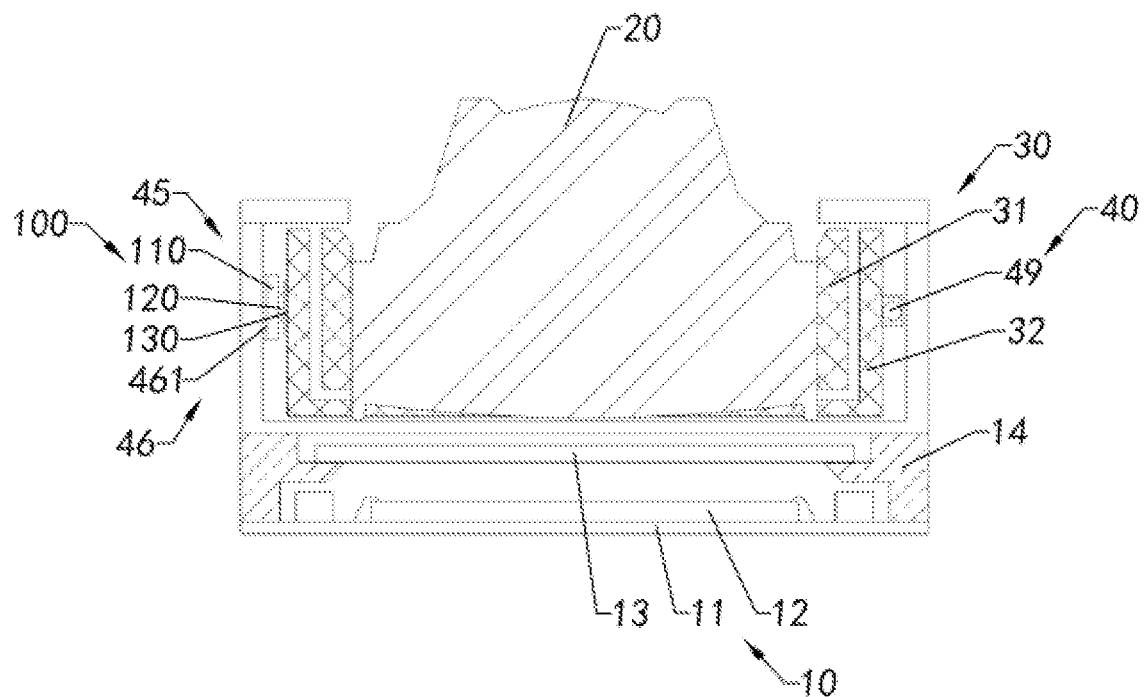
FIG. 1 illustrates a schematic view of a camera module according to an embodiment of the present disclosure.

As shown in FIG. 1, a camera module according to an embodiment of the present disclosure is illustrated. The camera module includes a photosensitive assembly 10, an optical camera lens 20 held on a photosensitive path of the photosensitive assembly 10, a frame carrier assembly 30, and a driving assembly 40 for driving the optical camera lens 20 for optical image stabilization.

Figure 2:
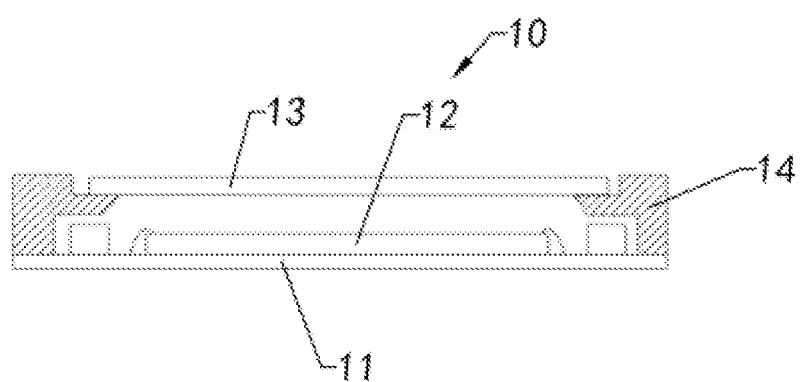
FIG. 2 illustrates a schematic view of a photosensitive assembly of the camera module according to the embodiment of the present disclosure.

As shown in FIG. 2, in this embodiment, the photosensitive assembly 10 includes a circuit board 11, a photosensitive chip 12 electrically connected to the circuit board 11, and a filter element 13 held on the photosensitive path of the photosensitive chip 12, wherein the circuit board 11 forms a mounting substrate of the photosensitive assembly 10. The circuit board may be designed as a Printed Circuit Board (PCB), a software combination board, or a reinforced Flexible Printed Circuit (PFC). Moreover, in some examples, a reinforcing plate (not shown) may also be arranged below the circuit board 11. For example, a steel sheet is arranged below the circuit board, so as to strengthen the strength of the circuit board and improve the heat dissipation performance of the photosensitive assembly through the steel sheet.

Further, in an example illustrated in FIG. 2, the photosensitive assembly 10 further includes a bracket 14 arranged on the circuit board 11, wherein the filter element 13 is mounted on the bracket 14 to be held on the photosensitive path of the photosensitive chip 12. In other examples of the present disclosure, a specific implementation that the filter element 13 is held on the photosensitive path of the photosensitive chip 12 is not limited in the present disclosure. For example, the filter element 13 may be designed as a filter film and coated on the surface of a certain optical lens of the zoom lens group to play the effect of light filtering. For another example, the photosensitive assembly 10 may further include a filter element bracket mounted on the bracket 14 (not shown), wherein the filter element 13 is held on the photosensitive path of the photosensitive chip 12 by being mounted on the filter element bracket.

In a specific example of the embodiment of the present disclosure, the bracket 14 may be designed as a plastic bracket, which is attached to the circuit board 11 by an adhesive. In other examples of the embodiment of the present disclosure, the bracket 14 may also be designed as an integrated bracket integrally formed on the circuit board 11, such as a molded bracket, which is not limited in the present disclosure.

As shown in FIG. 1, in the embodiment of the present disclosure, the frame carrier assembly 30 is mounted on the photosensitive assembly 10, wherein the frame carrier assembly 30 includes an outer frame carrier 33 mounted on the bracket 14, a second frame carrier 32 accommodated in the outer frame carrier 33 and the first frame carrier 31 accommodated in the second frame carrier 32. That is, in this embodiment, the frame carrier assembly includes a first frame carrier 31, a second frame carrier 32 externally arranged on the first frame carrier 31, and an outer frame carrier 33 externally arranged on the second frame carrier 32.

Particularly, in this embodiment, the optical camera lens 20 is mounted on the first frame carrier 31. In this way, the optical camera lens 20 is held on the photosensitive path of the photosensitive assembly 10. That is, in this embodiment, the first frame carrier 31 forms a mounting carrier of the optical camera lens.

Moreover, in the embodiment of the present disclosure, there is a gap between the second frame carrier 32 and the outer frame carrier 33, and there is a gap between the first frame carrier 31 and the second frame carrier 32. That is, there is an available space between the second frame carrier 32 and the outer frame carrier 33, wherein the available space can be used to mount a driver for driving the second frame carrier 32 to move. There is an available space between the first carrying frame 31 and the second frame carrier 32, wherein the available space can be used to mount a driver for driving the movement of the first frame carrier 31. Here, the selection and installation of the driver will be explained in more detail in the subsequent description.

As shown in FIG. 1, in the embodiment of the present disclosure, the optical camera lens 20 includes a lens barrel 21 and at least one optical lens 22 mounted in the lens barrel 21. It should be known by those skilled in the art that the resolution of the optical camera lens 20 is directly proportional to the number of optical lenses 22 within a certain range, that is, the higher the resolution, the more the number of optical lenses 22. In a specific implementation, the optical camera lens 20 may be designed as an integrated camera lens, or a split camera lens, wherein when the optical camera lens 20 is designed as an integrated camera lens, the optical camera lens 20 includes one lens barrel 21, and all of the optical lenses 22 are mounted in the lens barrel 21; and when the optical camera lens 20 is designed as a split optical camera lens, the optical camera lens 20 is assembled from at least two camera lens units.

As described previously, in order to meet the increasingly widespread market demands, high pixels, large chips and small sizes are irreversible development trends of the existing camera modules. With the development of photosensitive chips in the direction of high pixels and large chips, the size of optical components (such as filter elements, and optical camera lenses) that are compatible with photosensitive chips is also gradually increasing, which brings new challenges to driving elements used to drive the optical components for optical performance adjustment (e.g., optical focus, optical image stabilization, etc.).

Specifically, existing driving elements for driving optical components are electromagnetic motors, such as Voice Coil Motors (VCM), Shape Memory Alloy Actuators (SMA), etc. However, as the size of optical components increases, resulting in an increase in weight, the existing electromagnetic motors are gradually unable to provide sufficient driving force to drive the optical components to move. Quantitatively, existing voice coil motors and shape memory alloy drivers are only suitable for driving an optical component with the weight less than 100 mg. That is, if the weight of the optical camera lens exceeds 100 mg, the existing drivers will not be able to meet the application requirements of camera modules.

In addition, as mobile terminal equipment develops in the direction of miniaturization and thinness, the density of component layout inside the driving element has also increased. Correspondingly, the existing voice coil motor is internally provided with a coil and magnets. When the distance between two magnets is too close (less than 7 mm), their internal magnetic fields will interact with each other, resulting in displacement or vibration of the magnets, and reducing the stability of its drive control.

Therefore, an adapted new driving solution for camera modules is needed. The new driver can not only meet the driving requirements of the camera module for optical performance adjustment, but also meet the development requirements of lightness and thinness of the camera module.

That is, for a camera module, a new driver needs to meet the following requirements: relatively larger driving force, and better driving performance (specifically including: higher accuracy driving control and longer driving stroke). At the same time, in addition to seeking a driver that meets the requirements of new technologies, when selecting a new driver, it is also necessary to consider that the selected driver can adapt to the current development trend of lightness and thinness of the camera module.

After research and testing, the present disclosure provides a piezoelectric actuator with a new structure, which can meet the technical requirements of the camera module for the driver. Moreover, the piezoelectric actuator is further arranged in the camera module in a suitable arrangement, so that it meets the structural and dimensional design requirements of the camera module.

Figure 4:
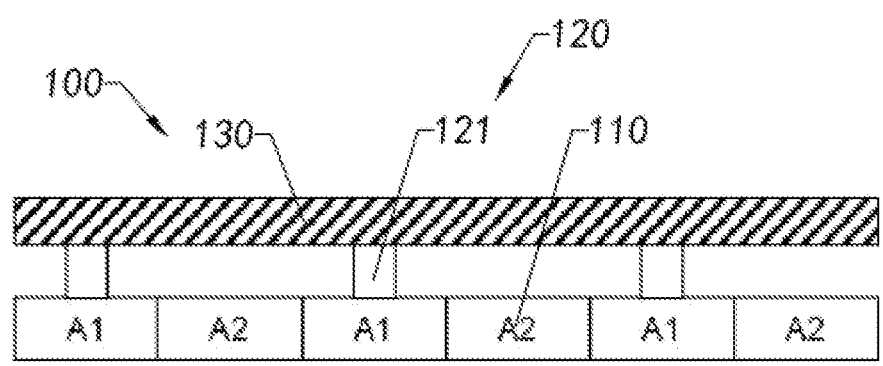
FIG. 4 illustrates a schematic view of a piezoelectric actuator according to the embodiment of the disclosure.

FIG. 4 illustrates a schematic view of a piezoelectric actuator according to the embodiment of the disclosure. As shown in FIG. 4, the piezoelectric actuator 100 according to the embodiment of the present disclosure includes a piezoelectric active portion 110 and a friction driving portion 120 that is driveably connected to the piezoelectric active portion 110, wherein after the piezoelectric actuator 100 is turned on, the friction driving portion 120 is configured to provide a driving force for driving a driven object under the action of the piezoelectric active portion 110.

Specifically, in this embodiment, the piezoelectric active portion 110 is designed as a piezoelectric ceramic element, which has an elongate structure. As shown in FIG. 4, the piezoelectric active portion 110 is a piezoelectric laminated structure. It has multiple sets of first polarization regions A1 and second polarization regions A2 alternately arranged, and the first polarization region A1 and the second polarization region A2 have opposite polarization directions, wherein after the piezoelectric actuator 100 is turned on, the multiple sets of first polarization regions A1 and second polarization regions A2 alternately arranged deform in different directions to bring the friction driving portion 120 to move in a traveling wave or standing wave manner along a preset direction, so as to provide a driving force for driving a component, as shown in FIG. 4.

Figure 5:
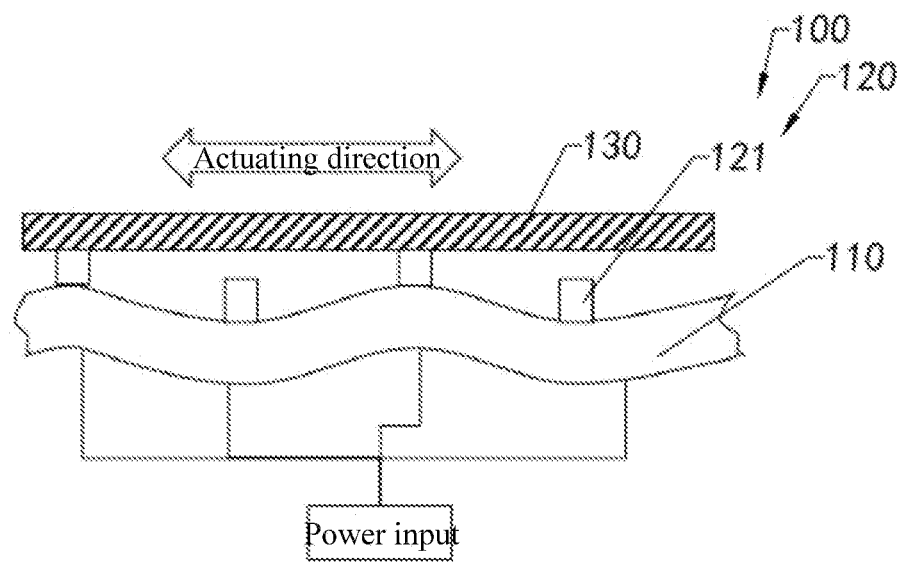
FIG. 5 illustrates a schematic view of the piezoelectric actuator after being turned on according to the embodiment of the present disclosure.

More specifically, with further reference to FIG. 5, in this embodiment, the piezoelectric active portion 110 has multiple sets of first polarization regions A1 and second polarization regions A2 arranged alternately, and the first polarization region A1 and the second polarization region A2 have opposite polarization directions. Here, it should be noted that in this embodiment, the multiple sets of alternating first polarization regions A1 and second polarization regions A2 are arranged side by side, that is, the multiple sets of alternating first polarization regions A1 and second polarization regions A2 are on the same straight line. Moreover, the piezoelectric active portion 110 is electrically connected to an external excitation power supply via a wire, so that after the piezoelectric active portion 110 is supplied with power for excitation, the piezoelectric active portion 110 deforms through the inverse piezoelectric effect of the piezoelectric active portion 110. It should be understood that the deformation of the piezoelectric active portion 110 will bring the friction driving portion 120 to move in a traveling wave or standing wave manner, that is, the deformation of the piezoelectric active portion 110 can be transmitted to the friction driving portion 120, so as to provide a driving force through the traveling wave or standing wave motion of the friction driving portion 120.

It is worth mentioning that, in other examples of the present disclosure, each set of first polarization regions A1 and second polarization regions A2 may also have the same polarization direction, wherein after the piezoelectric actuator 100 is turned on, by inputting alternating voltage signals to each set of first polarization regions A1 and second polarization regions A2, the multiple sets of first polarization regions A1 and second polarization regions A2 alternately arranged deform in different directions to bring the friction driving portion 120 to move in a standing wave manner along a preset direction, which is not limited in the present disclosure.

Further, in this embodiment, as shown in FIG. 4, the friction driving portion 120 includes a plurality of friction driving elements 121 spaced apart from each other, wherein a first end of each of the friction driving elements 121 is coupled to the piezoelectric active portion 110 so that the friction driving portion 120 is driveably connected to the piezoelectric active portion 110. Here, the number of the plurality of friction driving elements 121 may be 2, 3, 4 or more. Preferably, the number of the friction driving elements 121 exceeds 3 (i.e., greater than or equal to 3). With a configuration of this number, the length dimension of the piezoelectric actuator 100 can be controlled while the piezoelectric actuator 100 stably outputs linear driving force, so that it is suitable for being assembled in a relatively small device such as a camera module. In this embodiment, the length dimension of the piezoelectric actuator 100 is almost equal to the size of the piezoelectric active portion 110 (and the piezoelectric active portion 110 has an elongate shape). Quantitatively, in this embodiment, the length dimension of the piezoelectric actuator 100 is less than or equal to 20 mm, and preferably, its length dimension is less than or equal to 10 mm.

More preferably, in this embodiment, the plurality of friction driving elements 121 are located in a middle region of the piezoelectric active portion 110, so that when the driven object is driven by the plurality of friction driving elements 121, the movement of the driven object will be smoother and more linear.

It should be noted that in this embodiment, the friction driving element 121 has a columnar structure protruding from the upper surface of the piezoelectric active portion 110. From the appearance, the piezoelectric actuator 100 has a rack shape. It should be understood that, in other examples of the present disclosure, the friction driving element 121 may also be designed in other shapes, for example, its cross-sectional shape may be designed as a trapezoid, which is not limited in the present disclosure.

It is worth mentioning that when the number of the friction driving elements 121 exceeds 2, that is, when it is greater than or equal to 3, preferably, the at least 3 friction driving elements 121 are equidistantly arranged, which is helpful to improve the driving stability of the piezoelectric actuator 100.

Further, as shown in FIG. 4, in this embodiment, when the piezoelectric actuator 100 is not turned on, a plurality of end surfaces of the plurality of friction driving elements 121 at a second end opposite to the first end are on the same plane. For example, in the example illustrated in FIG. 3, the end surfaces of the plurality of friction driving elements 121 at the second end are on the same horizontal plane. That is, in this embodiment, the end surfaces of the second ends of the plurality of friction driving elements 121 form the same plane. Correspondingly, in some embodiments of the present disclosure, a layer of friction material may be further applied on the plane (that is, the plane defined by the end surfaces of the plurality of friction driving elements 121 at the second end) to increase frictional force.

It is worth mentioning that in practical applications, usually, a mover is further arranged on the upper surface of the friction driving portion 120, so that the traveling wave or standing wave driving force provided by the friction driving portion 120 is transmitted through the mover and acts on the driven object. That is, a friction actuating portion 130 (the friction actuating portion 130 serving as the mover) is arranged between the friction driving portion 120 and the driven object, so that when the piezoelectric actuator 100 is turned on, the traveling wave or standing wave motion of the friction driving portion 120 will drive the friction actuating portion 130 to move linearly. Specifically, the linear movement direction of the friction actuating portion 130 is opposite to the advancing direction of the traveling wave or standing wave of the friction driving portion 120.

In order to ensure that the traveling wave or standing wave driving force provided by the friction driving portion 120 can act on the friction actuating portion 130, it is necessary to ensure that a certain prepressing force is applied between the friction actuating portion 130 and the piezoelectric actuator 100, so that the friction driving portion 120 can be in contact with the friction actuating portion 130. Thus, the traveling wave or standing wave driving force provided by the friction driving portion 120 can be transmitted to the friction actuating portion 130 more efficiently.

Figure 6:
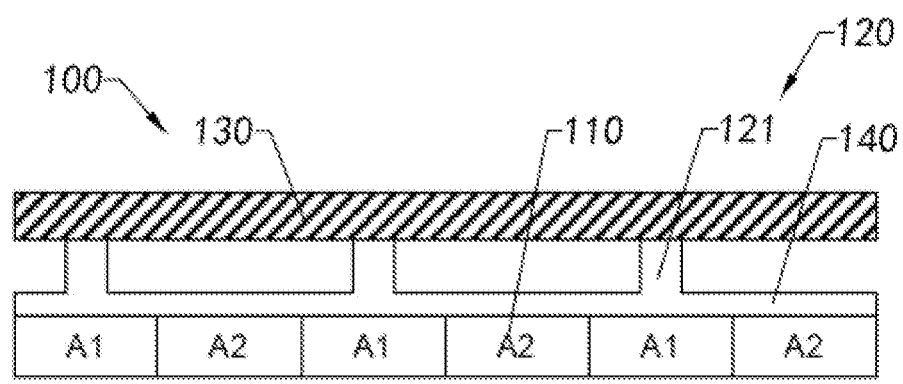
FIG. 6 illustrates a schematic view of a variant of the piezoelectric actuator according to the embodiment of the present disclosure.

FIG. 6 illustrates a schematic view of a variant of the piezoelectric actuator 100 according to the embodiment of the present disclosure. As shown in FIG. 6, in this embodiment, the piezoelectric actuator 100 further includes a friction connection layer 140 stacked on the piezoelectric active portion 110, and each of the friction driving elements 121 is coupled to the piezoelectric active portion 110 in such a manner that its first end is fixed to the friction connection layer 140. In this way, the deformation of the piezoelectric active portion 110 can be better transmitted through the friction connection layer 140 to the friction driving portion 120. In particular, in this embodiment, the friction driving element 121 and the friction connection layer 140 may have an integrated structure. Of course, in some examples, the friction driving element 121 and the friction connection layer 140 may have a split structure, that is, they are separate components.

Further, in the embodiment of the present disclosure, the piezoelectric actuator 100 has a relatively more optimized size. Quantitatively, the length dimension of the piezoelectric actuator 100 is less than or equal to 20 mm, preferably less than or equal to 10 mm, and for example, it may be 6 mm or 4.2 mm. The width dimension of the piezoelectric actuator 100 is less than or equal to 1 mm, preferably, less than or equal to 0.7 mm. The height dimension of the piezoelectric actuator 100 is less than or equal to 1 mm. Here, the height dimension of the piezoelectric actuator 100 is determined by the dimensions of the piezoelectric active portion 110 and the friction driving portion 120.

Compared with a traditional electromagnetic driver, the piezoelectric actuator 100 has the advantages of small size, large driving force and high accuracy. Quantitatively, the piezoelectric actuator 100 according to the embodiment of the present disclosure can provide a driving force ranging from 0.6N to 2 N, which is sufficient to drive a component with a weight more than 100 mg.

In addition to being able to provide a relatively large driving force, the piezoelectric actuator 100 also has other advantages over the traditional electromagnetic motor scheme and memory alloy motor scheme, including but not limited to: a relatively small size (with a slender shape), better response accuracy, a relatively simpler structure, relatively simpler driving control, high product consistency, no electromagnetic interference, a relatively larger stroke, short stabilization time, a relatively smaller weight, etc.

Specifically, the camera module requires that the configured driver has characteristics such as a long driving stroke and good alignment accuracy. In the existing voice coil motor scheme, in order to ensure the linearity of motion, it is necessary to design additional guide rods or ball guide rails; it is also necessary to adapt large-sized driving magnets/coils at the side part of the lens; and it is also necessary to set up auxiliary positioning devices such as balls, spring leaf, and suspension wires. In order to accommodate more components, ensure the structural strength and reserve structural gaps, it often leads to the larger lateral dimension of the module, the complicated structural design, and the heavier weight of the module. The memory alloy motor scheme is limited by the relatively small stroke that the memory alloy scheme can provide in the same proportion, and there are also reliability risks such as potential disconnection.

The piezoelectric actuator 100 has a relatively simple structure, and the assembly structure is simpler. In addition, the size of the piezoelectric active portion 110, the friction driving portion 120 and other elements is substantially unrelated to the size of the motion stroke. Therefore, in optical zoom products, the piezoelectric actuator 100 can realize the advantages of large driving force, small size, and small weight. Also, it is designed to match a larger stroke or a heavier component weight, and the integration degree in the design is also higher.

Further, the piezoelectric actuator 100 pushes the object to be pushed to perform micron-scale motion in a frictional contact manner. Compared with the non-contact manner of driving the object to be pushed in the electromagnetic scheme, in which it needs to rely on electromagnetic force to counteract gravity and frictional force, it has the advantages of greater driving force, greater displacement and lower power consumption, and also has higher control accuracy. Moreover, when there are a plurality of motor mechanisms, the piezoelectric actuator 100 does not have a magnet coil structure, so there is no magnetic interference problem. In addition, the piezoelectric actuator 100 can be self-locked through the frictional force between the components, and thus, the vibration and noise of the camera module during optical image stabilization can be reduced.

Figure 3:
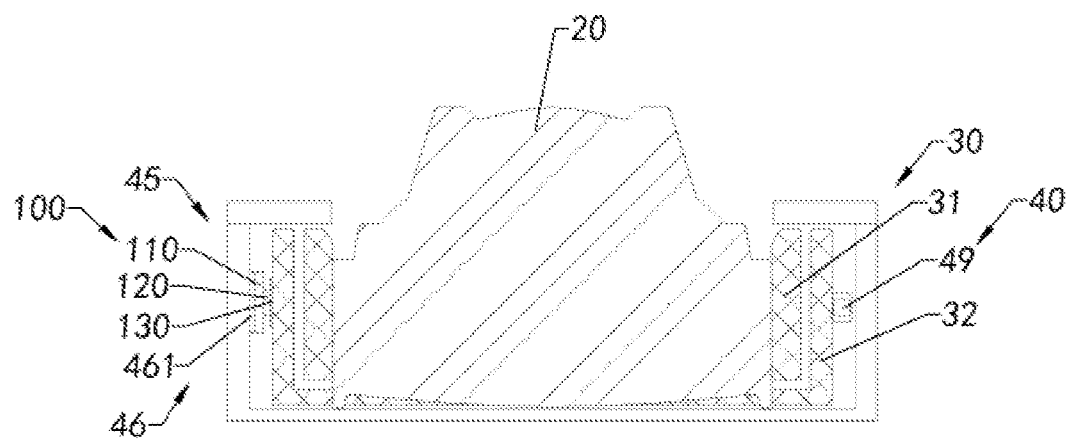
FIG. 3 illustrates a schematic view of an optical camera lens, a frame carrier assembly and a driving assembly of the camera module according to the embodiment of the present disclosure.
Figure 7:
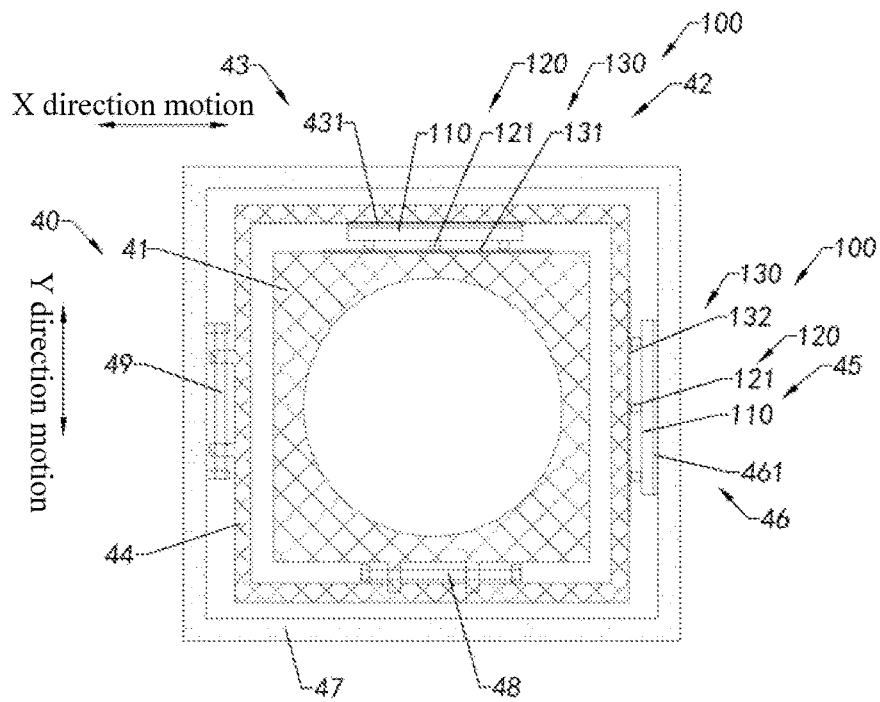
FIG. 7 illustrates another schematic view of the optical camera lens, the frame carrier assembly and the driving assembly of the camera module according to the embodiment of the present disclosure.

After the piezoelectric actuator 100 is selected as a driver to drive the photosensitive assembly 10 for optical image stabilization, specifically, as shown in FIGS. 3 and 7, in this embodiment, the driving assembly 40 includes a first driving element 42, a first prepressing component 43, a second driving element 45, and a second prepressing component 46, wherein the first driving element 42 and the second driving element 45 are designed as the piezoelectric actuator 100.

Correspondingly, as shown in FIGS. 3 and 7, in this embodiment, the optical camera lens 20 is mounted on the first frame carrier 31, and the first driving element 42 is abutted against the first frame carrier 31 in a frictional contact manner through the first prepressing component 43, and is configured to bring the first frame carrier 31 to drive the optical camera lens 20 to move in a plane perpendicular to the optical axis for optical image stabilization in a first direction. The second frame carrier 32 is externally arranged on the first frame carrier 31, wherein the second driving element 45 is abutted against the second frame carrier 32 in a frictional contact manner through the second prepressing component 46, and is configured to drive the second frame carrier 32 so as to bring the first frame carrier 31 to bring the optical camera lens 20 in a plane perpendicular to the optical axis for optical image stabilization in a second direction, the first direction being perpendicular to the second direction. In one example, the first direction is an X-axis direction, and the second direction is a Y-axis direction.

Here, the first driving element 42 being abutted against the first frame carrier 31 in a frictional contact manner means that: there is a prepressing force between the friction driving portion 120 of the first driving element 42 and the first frame carrier 31, so that the friction driving portion 120 of the first driving element 42 can drive the first frame carrier 31 by means of friction driving. Moreover, the prepressing force between the friction driving portion 120 of the first driving element 42 and the first frame carrier 31 may be a direct prepressing force or an indirect prepressing force, wherein the direct prepressing force means that the friction driving portion 120 of the first driving element 42 is in direct contact with the first frame carrier 31 to generate a prepressing force between the two; and the indirect prepressing force means that although the friction driving portion 120 of the first driving element 42 is not in direct contact with the first frame carrier 31, there is still a prepressing force between the two, so that the friction driving portion 120 of the first driving element 42 can drive the first frame carrier 31 by means of friction driving.

Correspondingly, the second driving element 45 being abutted against the second frame carrier 32 in a frictional contact manner means that: there is a prepressing force between the friction driving portion 120 of the second driving element 45 and the second frame carrier 32, and thus the friction driving portion 120 of the second driving element 45 can drive the second frame carrier 32 by means of friction driving. Moreover, the prepressing force between the friction driving portion 120 of the second driving element 45 and the second frame carrier 32 may be a direct prepressing force or an indirect prepressing force, wherein the direct prepressing force means that the friction driving portion 120 of the second driving element 45 is in direct contact with the second frame carrier 32 to generate a prepressing force between the two; and the indirect prepressing force means that although the friction driving portion 120 of the second driving element 45 is not in direct contact with the second frame carrier 32, there is still a prepressing force between the two, so that the friction driving portion 120 of the second driving element 45 can drive the second frame carrier 32 by means of friction driving.

More specifically, in this embodiment, as shown in FIGS. 3 and 7, the first driving element 42 is sandwiched between the first frame carrier 31 and the second frame carrier 32 through the first prepressing component 43, so that the first driving element 42 is abutted against the first frame carrier 31 in a frictional contact manner.

Correspondingly, in this embodiment, the first prepressing component 43 includes a first elastic element 431, and the first elastic element 431 is arranged between the piezoelectric active portion 110 of the first driving element 42 and the second frame carrier 32, so as to force the first driving element 42 to abut against the first frame carrier 31 in a frictional contact manner through an elastic force of the first elastic element 431. In this embodiment, the friction driving portion 120 of the first driving element 42 is directly in contact with the surface of the outer side wall of the first frame carrier 31, and correspondingly, the elastic force provided by the first elastic element 431 can force the friction driving portion 120 of the first driving element 42 to be in contact with the surface of the outer side wall of the first frame carrier 31 to form a frictional contact relationship between the two. In this way, after the first driving element 42 is turned on, the friction driving portion 120 of the first driving element 42 can drive the first frame carrier 31 to move along the first direction by means of friction driving, so as to bring the optical camera lens 20 to move along the first direction for optical image stabilization in the first direction.

In a specific example of the present disclosure, the first elastic element 431 is designed as an adhesive having elasticity, that is, the first elastic element 431 is designed as glue having elasticity after being cured. Correspondingly, during the installation process, a layer of adhesive with a thickness of 10 um to 50 um may be applied between the surface of the inner side wall of the second frame carrier 32 and the piezoelectric active portion 110 of the first driving element 42, so as to form the first elastic element 431 arranged between the piezoelectric active portion 110 of the first driving element 42 and the second frame carrier 32 after the adhesive is cured and molded. It should be understood that, in this example, the first elastic element 431 can also enable the first driving element 42 to be fixed on the surface of the inner side wall of the second frame carrier 32 while providing the prepressing force. Preferably, the first elastic member 431 has relatively high flatness, that is, when applying the adhesive, it is ensured as much as possible that the applied adhesive has relatively high flatness and uniformity, so that the first driving element 42 can be flatly fixed on the surface of the inner side wall of the second frame carrier 32, thereby improving the driving stability of the first driving element 42.

Correspondingly, in this embodiment, as shown in FIGS. 3 and 7, the second driving element 45 is sandwiched between the second frame carrier 32 and the outer frame carrier 33 through the second prepressing component 46, so that the second driving element 45 is abutted against the second frame carrier 32 in a frictional contact manner.

Further, as shown in FIGS. 3 and 7, in this embodiment, the second prepressing component 46 includes a second elastic element 461, and the second elastic element 461 is arranged between the piezoelectric active portion 110 of the second driving element 45 and the outer frame carrier 33, so as to force the second driving element 45 to abut against the second frame carrier 32 in a frictional contact manner through an elastic force of the second elastic element 461. Correspondingly, in this embodiment, the friction driving portion 120 of the second driving element 45 is directly in contact with the surface of the outer side wall of the second frame carrier 32, and correspondingly, the elastic force provided by the second elastic element 461 can force the friction driving portion 120 of the second driving element 45 to be in contact with the surface of the outer side wall of the second frame carrier 32 to form a frictional contact relationship between the two. In this way, after the second driving element 45 is turned on, the friction driving portion 120 of the second driving element 45 can drive the second frame carrier 32 to move along the second direction by means of friction driving, so as to bring the optical camera lens 20 to move along the second direction for optical image stabilization in the second direction.

In a specific example of the present disclosure, the second elastic element 461 is designed as an adhesive having elasticity, that is, the second elastic element 461 is designed as glue having elasticity after being cured. Correspondingly, during the installation process, a layer of adhesive with a thickness of 10 um to 50 um may be applied between the surface of the inner side wall of the outer frame carrier 33 and the piezoelectric active portion 110 of the second driving element 45, so as to form the second elastic element 461 arranged between the piezoelectric active portion 110 of the second driving element 45 and the outer frame carrier 33 after the adhesive is cured and molded. It should be understood that, in this example, the second elastic element 461 can also enable the second driving element 45 to be fixed on the surface of the inner side wall of the outer frame carrier 33 while providing the prepressing force. Preferably, the second elastic member 461 has relatively high flatness, that is, when applying the adhesive, it is ensured as much as possible that the applied adhesive has relatively high flatness and uniformity, so that the second driving element 45 can be flatly fixed on the surface of the inner side wall of the outer frame carrier 33, thereby improving the driving stability of the second driving element 45.

It is worth mentioning that, in other embodiments of the present disclosure, the first elastic element 431 and the second elastic element 461 may also be designed as elastic elements without viscosity, for example, rubber with the inherent characteristic of elasticity in the material itself, or a spring or leaf spring that produces elasticity due to deformation, etc., which is also not limited in the present disclosure.

Figure 8:
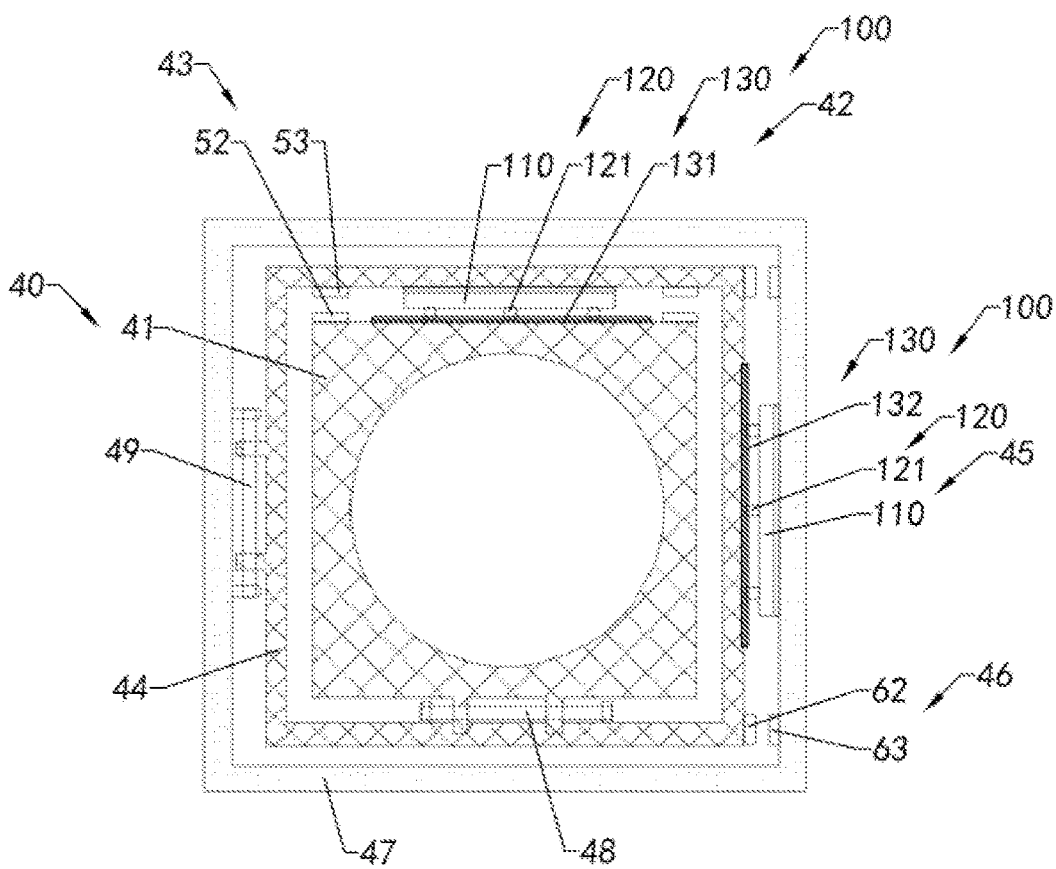
FIG. 8 illustrates a schematic view of a variant of the camera module according to the embodiment of the present disclosure.

It is worth mentioning that, in other variants of the present disclosure, the structural configuration of the first prepressing component 43 and the second prepressing component 46 may also be adjusted. Specifically, as shown in FIG. 8, in other examples of the present disclosure, the first prepressing component 43 includes a first magnetic attraction element 52 arranged on the first frame carrier 31 and a second magnetic attraction element 53 arranged on the second frame carrier 32 and corresponding to the first magnetic attraction element 52, as so to force the first driving element 42 to abut against the first frame carrier 31 in a frictional contact manner through an magnetic attraction action between the first magnetic attraction element 52 and the second magnetic attraction element 53.

In this variant, the first magnetic attraction element 52 and the second magnetic attraction element 53 refer to magnetic attraction assemblies that can attract each other. For example, the first magnetic attraction element 52 may be designed as a magnet, and the second magnetic attraction element 53 may be designed as a magnetic component, for example, a material made of a metal such as iron, nickel, cobalt or the like. For another example, the first magnetic attraction element 52 may be designed as a magnet, and the second magnetic attraction element 53 may also be designed as a magnet.

The second prepressing component 46 includes a third magnetic attraction element 62 arranged on the second frame carrier 32 and a fourth magnetic attraction element 63 arranged on the outer frame carrier 33 and corresponding to the third magnetic attraction element 62, as so to force the second driving element 45 to abut against the second frame carrier 32 in a frictional contact manner through an magnetic attraction action between the third magnetic attraction element 62 and the fourth magnetic attraction element 63.

In this variant, the third magnetic attraction element 62 and the fourth magnetic attraction element 63 refer to magnetic attraction assemblies that can attract each other. For example, the third magnetic attraction element 62 may be designed as a magnet, and the fourth magnetic attraction element 63 may be designed as a magnetic component, for example, a material made of a metal such as iron, nickel, cobalt or the like. For another example, the third magnetic attraction element 62 may be designed as a magnet, and the fourth magnetic attraction element 63 may also be designed as a magnet.

In order to enable the first driving element 42 and the second driving element 45 to drive the first frame carrier 31 and the second frame carrier 32 more smoothly, as shown in FIG. 3, the driving assembly 40 further includes a first guiding mechanism 48 arranged between the first frame carrier 41 and the second frame carrier 32 and a second guiding mechanism 49 arranged between the second frame carrier 32 and the outer frame carrier 33, wherein the first guiding mechanism 48 is configured to guide the first frame carrier 41 to move along the first direction, and the second guiding mechanism 49 is configured to guide the second frame carrier 32 to move along the second direction.

More specifically, as shown in FIGS. 3 and 7, in this embodiment, the first guiding mechanism 48 and the second guiding mechanism 49 are designed as guide rod structures. Correspondingly, the first guiding mechanism 48 includes a first guide rod arranged on the outer side wall of the first frame carrier 31 and extending along the first direction, wherein both ends of the first guide rod are fixed on the inner side wall of the second frame carrier 32. In particular, in this embodiment, the first guide rod and the first driving element 42 are oppositely arranged in the same direction. Thus, after the first driving element 42 is turned on, the first frame carrier 31 is guided to move along the direction in which the first guide rod extends, so as to improve the movement stability of the first frame carrier 31.

Correspondingly, in this embodiment, the second guiding mechanism 49 includes a second guide rod arranged on the outer side wall of the second frame carrier 32 and extending along the second direction, wherein both ends of the second guide rod are fixed on the inner side wall of the outer frame carrier 33. In particular, in this embodiment, the second guide rod and the second driving element 45 are oppositely arranged in the same direction. Thus, after the second driving element 45 is turned on, the second frame carrier 32 is guided to move along the direction in which the second guide rod extends, so as to improve the movement stability of the second frame carrier 32.

It is worth mentioning that, in other embodiments of the present disclosure, the first guiding mechanism 48 and the second guiding mechanism 49 may also be realized based on other principles, for example, through a rolling ball-rolling groove mechanism, a slider-sliding groove mechanism, etc., which is not limited in the present disclosure.

In order to optimize the driving performance of the first driving element 42 and the second driving element 45, as shown in FIGS. 3 and 7, the driving assembly 40 further includes a first friction actuating portion 131 and a second friction actuating portion 132, wherein the first friction actuating portion 131 is arranged between the first driving element 42 and the first frame carrier 31, the friction driving portion 120 of the first driving element 42 is in contact with the first friction actuating portion 131 under the action of the first prepressing component 43, and the first friction actuating portion 131 is in contact with the surface of the outer side wall of the first frame carrier 31. In this way, the friction driving force provided by the first driving element 42 can act on the first frame carrier 31 through the first friction actuating portion 131, so as to bring the first frame carrier 31 and the optical camera lens 20 to move along the first direction. That is, in this variant, the prepressing force between the friction driving portion 120 of the first driving element 42 and the first frame carrier 31 is an indirect prepressing force, that is, although the friction driving portion 120 of the first driving element 42 is not in direct contact with the first frame carrier 31, there is still a prepressing force between the two, so that the friction driving portion 120 of the first driving element 42 can drive the first frame carrier 31 by means of friction driving.

Correspondingly, the second friction actuating portion 132 is arranged between the second driving element 45 and the second frame carrier 32, and the friction driving portion 120 of the second driving element 45 is in contact with the second friction actuating portion 132 under the action of the second prepressing component 46, and the second friction actuating portion 132 is in contact with the surface of the outer wall of the second frame carrier 32. In this way, the friction driving force provided by the second driving element 45 can act on the second frame carrier 32 via the second friction actuating portion 132, so as to bring the second frame carrier 32, the first frame carrier 31 and the optical camera lens 20 to move along the second direction for optical image stabilization in the second direction.

More specifically, as shown in FIGS. 3 and 7, in this embodiment, the first friction actuating portion 131 has a first surface and a second surface opposite to the first surface, wherein under the action of the first prepressing component 43, the first surface of the first friction actuating portion 131 is in contact with the surface of the outer side wall of the first frame carrier 31, and the second surface is in contact with the end face of at least one of the plurality of friction driving element 121 at the second end. In this way, the friction driving portion 120 of the first driving element 42 is in contact with the first friction actuating portion 131 and the first friction actuating portion 131 is in contact with the first frame carrier 31, so that the friction driving force provided by the first driving element 42 can act on the first frame carrier 31 via the first friction actuating portion 131. Correspondingly, the second friction actuating portion 132 has a third surface and a fourth surface opposite to the third surface, wherein under the action of the second prepressing component 46, the third surface of the second friction actuating portion 132 is in contact with the surface of the outer side wall of the second frame carrier 32, and the fourth surface is in contact with the end surface of at least one of the plurality of friction driving elements 121 at the second end. In this way, the friction driving portion 120 of the second driving element 45 is in contact with the second friction actuating portion 132 and the second friction actuating portion 132 is in contact with the second frame carrier 32, so that the friction driving force provided by the second driving element 45 can act on the second frame carrier 32 via the second friction actuating portion 132.

It is worth mentioning that, although in the embodiment illustrated in FIGS. 3 and 7, the first friction actuating portion 131 and the second friction actuating portion 132, as a separate component, are arranged between the first driving element 42 and the first frame carrier 31, and between the second driving element 45 and the second frame carrier 32, respectively, for example, the first friction actuating portion 131 is designed as a separate component and is attached to the side surface of the first frame carrier 31, or, the second friction actuating portion 132 is designed as a separate component and is attached to the side surface of the second frame carrier 32. For another example, the first friction actuating portion 131 is designed as a coating coated on the side surface of the first frame carrier 31, or the second friction actuating portion 132 is designed as a coating coated on the side surface of the second frame carrier 32. It should be understood that, in other examples of the present disclosure, the first friction actuating portion 131 may also be integrally formed on the surface of the outer side wall of the first frame carrier 31, that is, the first friction actuating portion 131 and the first frame carrier 31 has an integrated structure. Of course, in other examples of the present disclosure, the second friction actuating portion 132 may also be integrally formed on the surface of the outer side wall of the second frame carrier 32, that is, the second friction actuating portion 132 and the second frame carrier 32 has an integrated structure.

It is also worth mentioning that, in this variant, the length of the first friction actuating portion 131 is greater than the length of the first driving element 42, and the length of the second friction actuating portion 131 is greater than the length of the second driving element 43. Thus, when the first frame carrier 31 and the second frame carrier 32 are driven in a friction driving manner through the first driving element 41 and the second driving element 42, respectively, the first frame carrier 31 and the second frame carrier 32 have enough strokes to ensure the movement linearity of the first frame carrier 31 and the second frame carrier 32. Of course, in other examples of the present disclosure, the length of the first friction actuating portion 131 may also be less than or equal to the length of the first driving element 42, and the length of the second friction actuating portion 132 may also be less than or equal to the length of the second driving element 43, which is not limited in the present disclosure.

Figure 9:
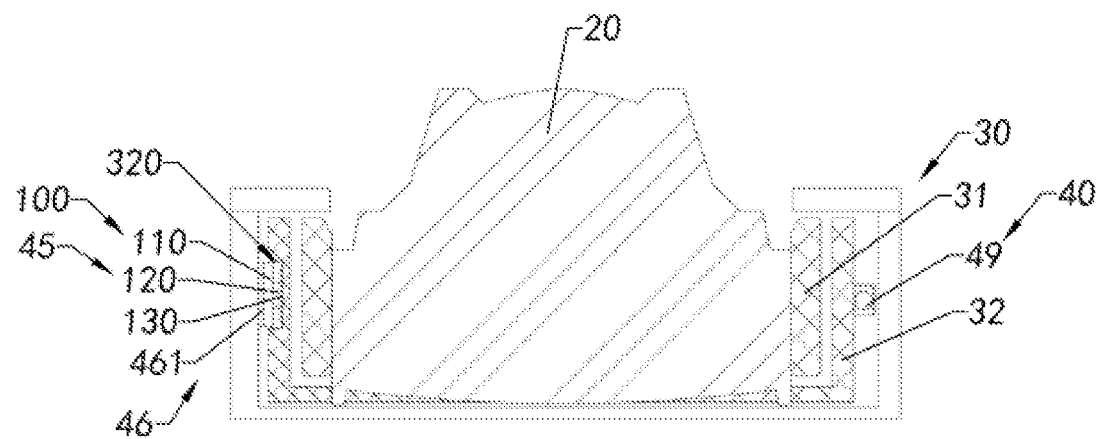
FIG. 9 illustrates a schematic view of another variant of the camera module according to the embodiment of the present disclosure.

FIG. 9 illustrates a schematic view of another variant of the camera module according to the embodiment of the present disclosure. Compared with the example illustrated in FIGS. 3 and 7, in this variant example, the first frame carrier 31 has a first groove 310 recessedly formed on its surface, and the friction driving portion 120 of the first driving element 42 is arranged in the first groove 310; and the second frame carrier 32 has a second groove 320 recessedly formed on its surface, and the friction driving portion 120 of the second driving element 45 is arranged in the second groove 320. That is, in this variant, the first driving element 42 is at least partially accommodated in the first groove 310, and the second driving element 45 is at least partially accommodated in the second groove 320. Preferably, a part of the piezoelectric active portion 110 of the first driving element 42 is accommodated in the first groove 310, and a part of the piezoelectric active portion 110 of the second driving element 45 is accommodated in the second groove 320.

In this way, when the first driving element 42 drives the first frame carrier 31 in the first groove 310, the first groove 310 itself forms a guiding groove for guiding the first frame carrier 31 to move. That is, in this variant, the first groove 310 not only provides an installation space for the installation of the first driving element 42, but also itself forms a guiding structure for guiding the movement of the first frame carrier 31 (in other words, regulating the movement of the first driving element 42). Likewise, when the second driving element 45 drives the second frame carrier 32 in the second groove 320, the second groove 320 itself forms a guiding groove for guiding the movement of the second frame carrier 32. That is, in this variant, the second groove 320 not only provides an installation space for the installation of the first driving element 42, but also itself forms a guiding structure for guiding the movement of the second frame carrier 32 (in other words, regulating the movement of the second driving element 45).

Particularly, in this variant, the length dimensions of the first driving element 42 and the second driving element 45 are smaller than those of the first groove 310 and the second groove 320, and the width dimensions of the first driving element 42 and the second driving element 45 are slightly smaller than or equal to those of the first groove 310 and the second groove 320.

FIG. 9 illustrates a schematic view of still another variant of the camera module according to the embodiment of the present disclosure. Compared with the example illustrated in FIGS. 3 and 7, in this variant, the arrangement of the first driving element 42 and the second driving element 45 is changed.

Figure 10:
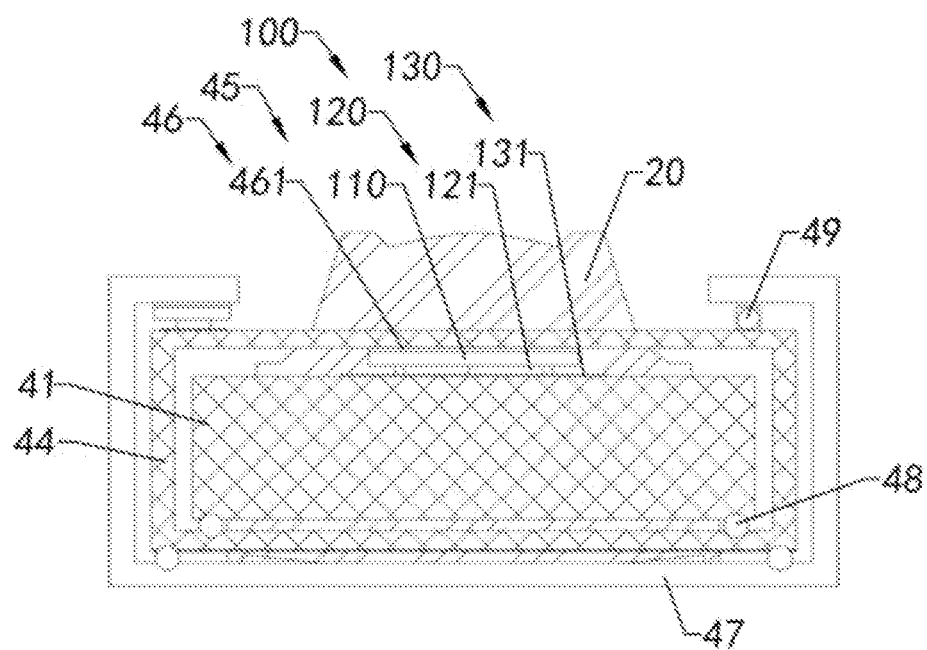
FIG. 10 illustrates a schematic view of still another variant of the camera module according to the embodiment of the present disclosure.

Specifically, in the example illustrated in FIGS. 3 and 7, the first driving element 42 is located on the side part of the first frame carrier 31, and the second driving element 45 is located on the side part of the second frame carrier 32. In contrast, as shown in FIG. 10, in this variant, the first driving element 42 is located on the upper part of the first frame carrier 31, and the second driving element 45 is located on the upper part of the second frame carrier 32.

In a specific example of this variant, the first driving element 42 is sandwiched between the first frame carrier 31 and the second frame carrier 32 up and down through the first prepressing component 43, so that the first driving element 42 is abutted against the first frame carrier 31 in a frictional contact manner. The second driving element 45 is sandwiched between the second frame carrier 32 and the outer frame carrier 33 up and down through the second prepressing component 46, so that the second driving element 45 is abutted against the second frame carrier 32 in a frictional contact manner.

Figure 11:
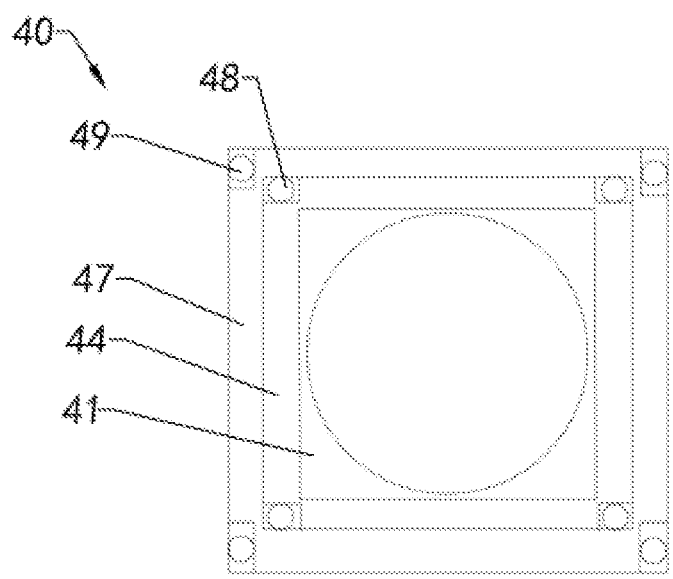
FIG. 11 illustrates a schematic view of still another variant of the camera module according to the embodiment of the present disclosure.

Correspondingly, the driving assembly 40 further includes a first guiding mechanism 48 arranged between the first frame carrier 41 and the second frame carrier 32, and a second guiding mechanism 49 arranged between the second frame carrier 32 and the outer frame carrier 33. However, unlike the example illustrated in FIGS. 3 and 7, in this variant, the first guiding mechanism 48 and the second guiding mechanism 49 are designed as a rolling ball-rolling groove mechanism, as shown in FIG. 11.

Figure 12:
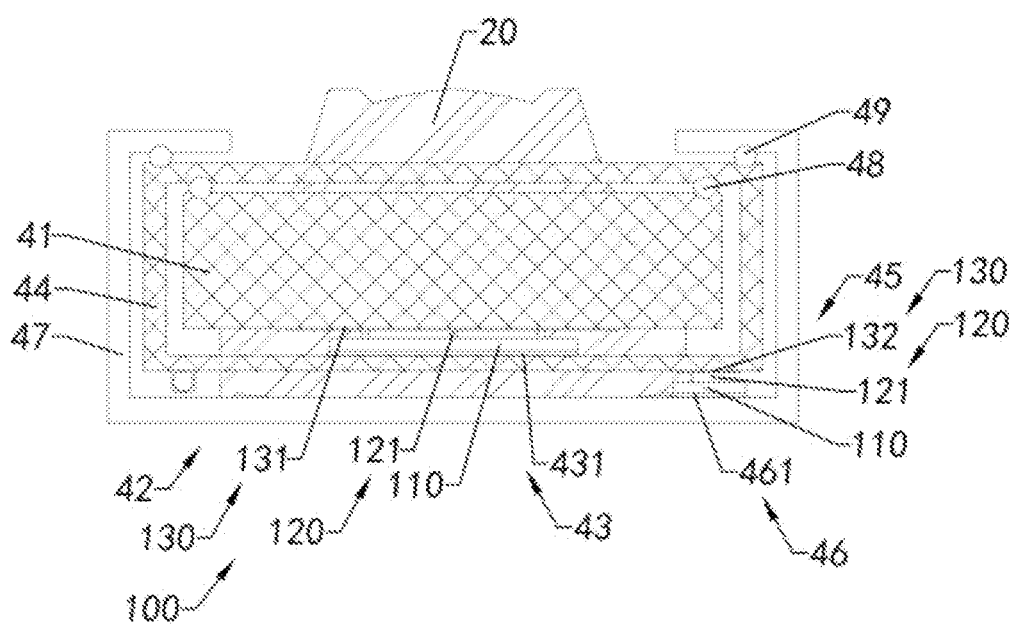
FIG. 12 illustrates a schematic view of still another variant of the camera module according to the embodiment of the present disclosure.

FIG. 12 illustrates a schematic view of still another variant of the camera module according to the embodiment of the present disclosure. Compared with the example illustrated in FIGS. 3 and 7, in this variant, the arrangement of the first driving element 42 and the second driving element 45 is changed again.

Specifically, as shown in FIG. 12, in this variant, the first driving element 42 is located on the lower part of the first frame carrier 31, and the second driving element 45 is located on the lower part of the second frame carrier 32.

In a specific example of this variant, the first driving element 42 is sandwiched between the first frame carrier 31 and the second frame carrier 32 up and down through the first prepressing component 43, so that the first driving element 42 is abutted against the first frame carrier 31 in a frictional contact manner. The second driving element 45 is sandwiched between the second frame carrier 32 and the outer frame carrier 33 up and down through the second prepressing component 46, so that the second driving element 45 is abutted against the second frame carrier 32 in a frictional contact manner.

Correspondingly, the driving assembly 40 further includes a first guiding mechanism 48 arranged between the first frame carrier 41 and the second frame carrier 32, and a second guiding mechanism 49 arranged between the second frame carrier 32 and the outer frame carrier 33. However, unlike the example illustrated in FIGS. 3 and 7, in this variant, the first guiding mechanism 48 and the second guiding mechanism 49 are designed as a rolling ball-rolling groove mechanism, as shown in FIG. 12.

In summary, the camera module based on the embodiment of the present disclosure is explained, wherein the camera module adopts the piezoelectric actuator 100 as a driver, which can not only meet the driving requirements of the camera module for optical performance adjustment, but also meet the development demands of the camera module for lightness and thinness.

Although the camera module is a traditional upright camera module as an example in the embodiment of the present disclosure, it should be understood by those of ordinary skill in the art that the piezoelectric actuator 100 according to the embodiment of the present disclosure may also be used as a driver in a periscope camera module, which is not limited in the present disclosure.

Exemplary Camera Module

Figure 13:
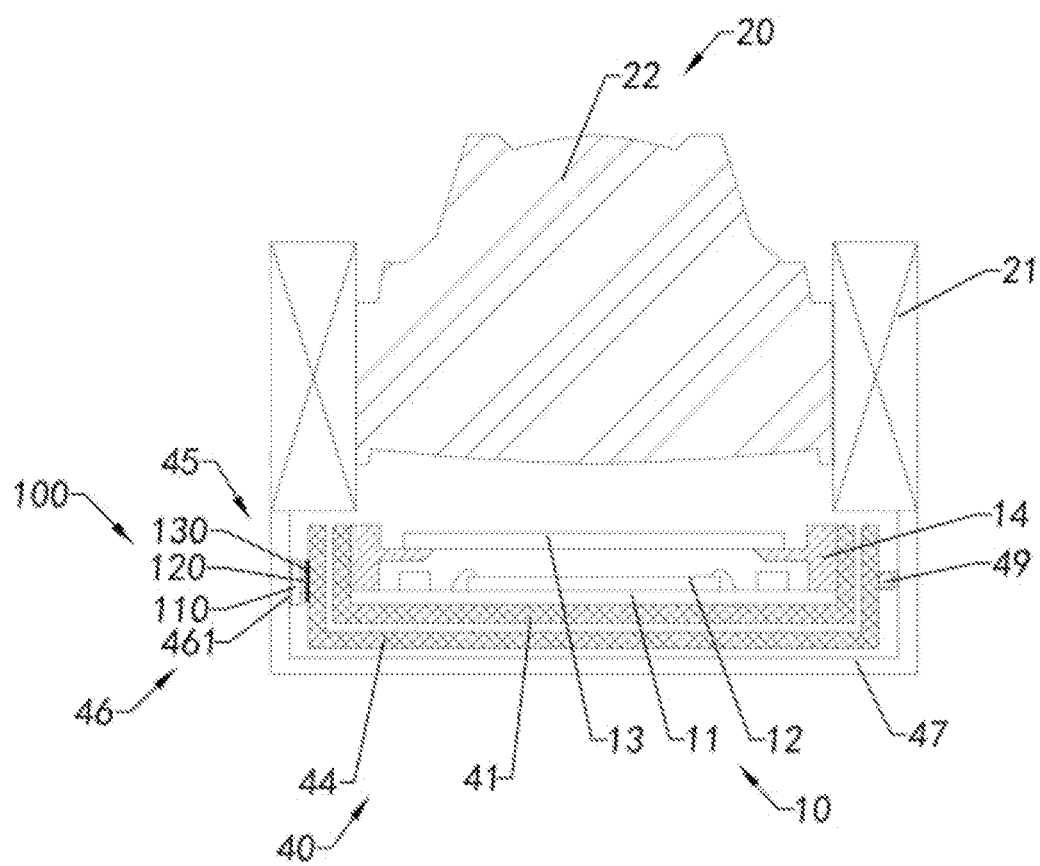
FIG. 13 illustrates a schematic view of a camera module according to an embodiment of the present disclosure.

As shown in FIG. 13, a camera module according to an embodiment of the present disclosure is explained. The camera module includes a photosensitive assembly 10, a lens assembly 20 held on a photosensitive path of the photosensitive assembly 10, and a driving assembly 40 for driving the photosensitive assembly 10 for optical image stabilization.

Correspondingly, the lens assembly 20 includes a lens carrier 21 and an optical camera lens 22 mounted on the lens carrier 21. In this embodiment, the optical camera lens 22 includes a lens barrel and at least one optical lens 22 mounted in the lens barrel. It should be known by those skilled in the art that the resolution of the optical camera lens 20 is directly proportional to the number of optical lenses 22 within a certain range, that is, the higher the resolution, the more the number of optical lenses 22. In a specific implementation, the optical camera lens 22 may be designed as an integrated camera lens, or a split camera lens, wherein when the optical camera lens 22 is designed as an integrated camera lens, the optical camera lens 22 includes one lens barrel, and all of the optical lenses 22 are mounted in the lens barrel; and when the optical camera lens 22 is designed as a split optical camera lens, the optical camera lens 22 is assembled from at least two camera lens units.

Moreover, in this embodiment, the lens carrier 21 is a fixed carrier, that is, when the optical camera lens 22 is mounted on the lens carrier 21, the relative positional relationship between the lens carrier 21 and the optical camera lens 22 does not change. It should be understood that, in other examples of the present disclosure, the lens carrier 21 may also be designed as a driving carrier, so that the relative positional relationship between the optical camera lens 21 and the photosensitive assembly 10 can be changed by the driving carrier for autofocus, which is not limited in the present disclosure.

Figure 14:
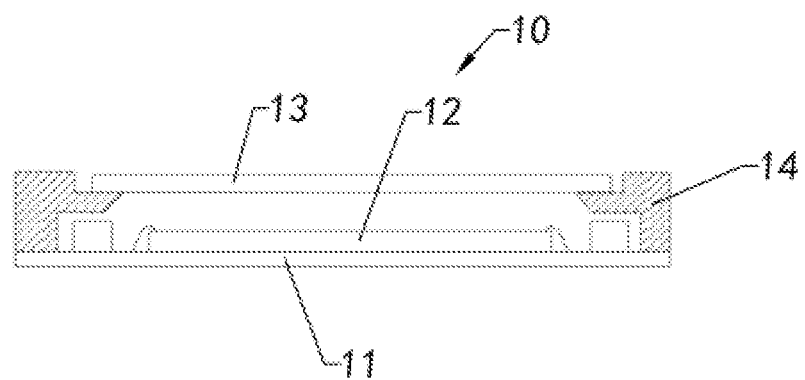
FIG. 14 illustrates a schematic view of a photosensitive assembly of the camera module according to the embodiment of the present disclosure.

As shown in FIG. 14, in this embodiment, the photosensitive assembly 10 includes a circuit board 11, a photosensitive chip 12 electrically connected to the circuit board 11, and a filter element 13 held on the photosensitive path of the photosensitive chip 12, wherein the circuit board 11 forms a mounting substrate of the photosensitive assembly 10. The circuit board may be designed as a Printed Circuit Board (PCB), a software combination board, or a reinforced Flexible Printed Circuit (PFC). Moreover, in some examples, a reinforcing plate (not shown) may also be arranged below the circuit board 11. For example, a steel sheet is arranged below the circuit board, so as to strengthen the strength of the circuit board and improve the heat dissipation performance of the photosensitive assembly through the steel sheet.

Further, in an example illustrated in FIG. 14, the photosensitive assembly 10 further includes a bracket 14 arranged on the circuit board 11, wherein the filter element 13 is mounted on the bracket 14 to be held on the photosensitive path of the photosensitive chip 12. In other examples of the present disclosure, a specific implementation that the filter element 13 is held on the photosensitive path of the photosensitive chip 12 is not limited in the present disclosure. For example, the filter element 13 may be designed as a filter film and coated on the surface of a certain optical lens of the zoom lens group to play the effect of light filtering. For another example, the photosensitive assembly 10 may further include a filter element bracket (not shown) mounted on the bracket 14, wherein the filter element 13 is held on the photosensitive path of the photosensitive chip 12 by being mounted on the filter element bracket.

In a specific example of the embodiment of the present disclosure, the bracket 14 may be designed as a plastic bracket, which is attached to the circuit board 11 by an adhesive. In other examples of the embodiment of the present disclosure, the bracket 14 may also be designed as an integrated bracket integrally formed on the circuit board 11, such as a molded bracket, which is not limited in the present disclosure.

As described previously, in order to meet the increasingly widespread market demands, high pixels, large chips and small sizes are irreversible development trends of the existing camera modules. With the development of photosensitive chips in the direction of high pixels and large chips, the size of optical components (such as filter elements, and optical camera lenses) that are compatible with photosensitive chips is also gradually increasing, which brings new challenges to driving elements used to drive the optical components for optical performance adjustment (e.g., optical focus, optical image stabilization, etc.).

Specifically, existing driving elements for driving optical components are electromagnetic motors, such as Voice Coil Motors (VCM), Shape Memory Alloy Actuators (SMA), etc. However, as the size of optical components increases, resulting in an increase in weight, the existing electromagnetic motors are gradually unable to provide sufficient driving force to drive the optical components to move. Quantitatively, existing voice coil motors and shape memory alloy drivers are only suitable for driving an optical component with the weight less than 100 mg. That is, if the weight of the optical camera lens exceeds 100 mg, the existing drivers will not be able to meet the application requirements of camera modules.

In addition, as mobile terminal equipment develops in the direction of miniaturization and thinness, the density of component layout inside the driving element has also increased. Correspondingly, the existing voice coil motor is internally provided with a coil and magnets. When the distance between two magnets is too close (less than 7 mm), their internal magnetic fields will interact with each other, resulting in displacement or vibration of the magnets, and reducing the stability of its drive control.

Therefore, an adapted new driving solution for camera modules is needed. The new driver can not only meet the driving requirements of the camera module for optical performance adjustment, but also meet the development requirements of lightness and thinness of the camera module.

That is, for a camera module, a new driver needs to meet the following requirements: relatively larger driving force, and better driving performance (specifically including: higher accuracy driving control and longer driving stroke). At the same time, in addition to seeking a driver that meets the requirements of new technologies, when selecting a new driver, it is also necessary to consider that the selected driver can adapt to the current development trend of lightness and thinness of the camera module.

After research and testing, the present disclosure provides a piezoelectric actuator with a new structure, which can meet the technical requirements of the camera module for the driver. Moreover, the piezoelectric actuator is further arranged in the camera module in a suitable arrangement, so that it meets the structural and dimensional design requirements of the camera module.

Figure 16:
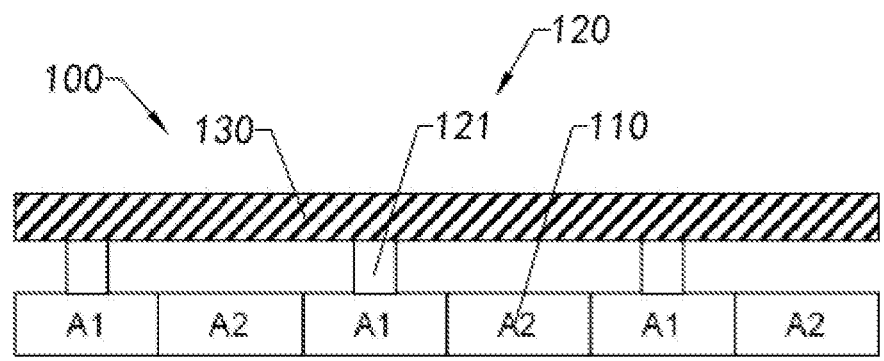
FIG. 16 illustrates a schematic view of a piezoelectric actuator according to the embodiment of the disclosure.

FIG. 16 illustrates a schematic view of a piezoelectric actuator according to the embodiment of the disclosure. As shown in FIG. 16, the piezoelectric actuator 100 according to the embodiment of the present disclosure includes a piezoelectric active portion 110 and a friction driving portion 120 that is driveably connected to the piezoelectric active portion 110, wherein after the piezoelectric actuator 100 is turned on, the friction driving portion 120 is configured to provide a driving force for driving a driven object under the action of the piezoelectric active portion 110.

Specifically, in this embodiment, the piezoelectric active portion 110 is designed as a piezoelectric ceramic element, which has an elongate structure. As shown in FIG. 16, the piezoelectric active portion 110 is a piezoelectric laminated structure. It has multiple sets of first polarization regions A1 and second polarization regions A2 alternately arranged, and the first polarization region A1 and the second polarization region A2 have opposite polarization directions, wherein after the piezoelectric actuator 100 is turned on, the multiple sets of first polarization regions A1 and second polarization regions A2 alternately arranged deform in different directions to bring the friction driving portion 120 to move in a traveling wave or standing wave manner along a preset direction, so as to provide a driving force for driving a component, as shown in FIG. 16.

Figure 17:
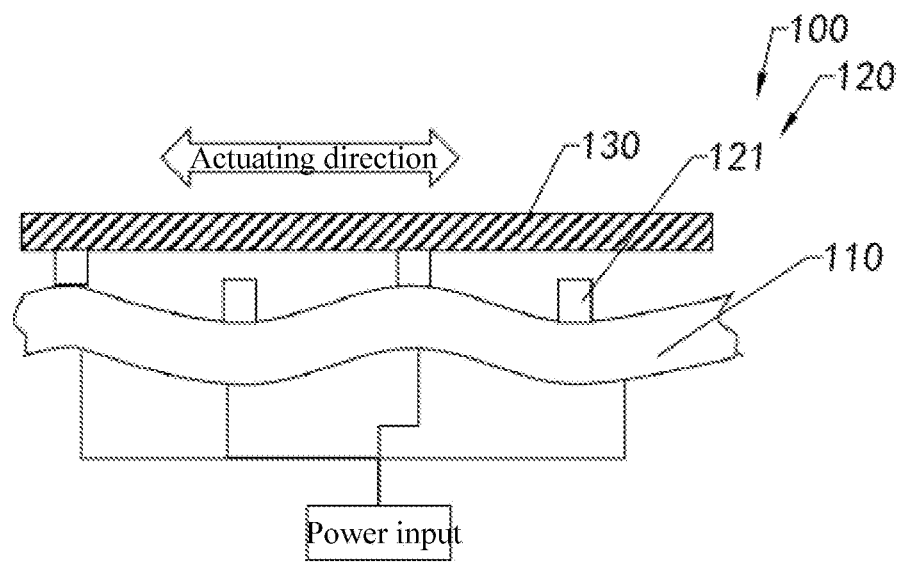
FIG. 17 illustrates a schematic view of the piezoelectric actuator after being turned on according to the embodiment of the present disclosure.

More specifically, with further reference to FIG. 17, in this embodiment, the piezoelectric active portion 110 has multiple sets of first polarization regions A1 and second polarization regions A2 arranged alternately, and the first polarization region A1 and the second polarization region A2 have opposite polarization directions. Here, it should be noted that in this embodiment, the multiple sets of alternating first polarization regions A1 and second polarization regions A2 are arranged side by side, that is, the multiple sets of alternating first polarization regions A1 and second polarization regions A2 are on the same straight line. Moreover, the piezoelectric active portion 110 is electrically connected to an external excitation power supply via a wire, so that after the piezoelectric active portion 110 is supplied with power for excitation, the piezoelectric active portion 110 deforms through the inverse piezoelectric effect of the piezoelectric active portion 110. It should be understood that the deformation of the piezoelectric active portion 110 will drive the friction driving portion 120 to move in a traveling wave or standing wave manner, that is, the deformation of the piezoelectric active portion 110 can be transmitted to the friction driving portion 120, so as to provide a driving force through the traveling wave or standing wave motion of the friction driving portion 120.

It is worth mentioning that, in other examples of the present disclosure, each set of first polarization regions A1 and second polarization regions A2 may also have the same polarization direction, wherein after the piezoelectric actuator 100 is turned on, by inputting alternating voltage signals to each set of first polarization regions A1 and second polarization regions A2, the multiple sets of first polarization regions A1 and second polarization regions A2 alternately arranged deform in different directions to bring the friction driving portion 120 to move in a standing wave manner along a preset direction, which is not limited in the present disclosure.

Further, in this embodiment, as shown in FIG. 16, the friction driving portion 120 includes a plurality of friction driving elements 121 spaced apart from each other, wherein a first end of each of the friction driving elements 121 is coupled to the piezoelectric active portion 110 so that the friction driving portion 120 is driveably connected to the piezoelectric active portion 110. Here, the number of the plurality of friction driving elements 121 may be 2, 3, 4 or more. Preferably, the number of the friction driving elements 121 exceeds 3 (i.e., greater than or equal to 3). With a configuration of this number, the length dimension of the piezoelectric actuator 100 can be controlled while the piezoelectric actuator 100 stably outputs linear driving force, so that it is suitable for being assembled in a relatively small device such as a camera module. In this embodiment, the length dimension of the piezoelectric actuator 100 is almost equal to the size of the piezoelectric active portion 110 (and the piezoelectric active portion 110 has an elongate shape). Quantitatively, in this embodiment, the length dimension of the piezoelectric actuator 100 is less than or equal to 20 mm, and preferably, its length dimension is less than or equal to 10 mm.

More preferably, in this embodiment, the plurality of friction driving elements 121 are located in a middle region of the piezoelectric active portion 110, so that when the driven object is driven by the plurality of friction driving elements 121, the movement of the driven object will be smoother and more linear.

It should be noted that in this embodiment, the friction driving element 121 has a columnar structure protruding from the upper surface of the piezoelectric active portion 110. From the appearance, the piezoelectric actuator 100 has a rack shape. It should be understood that, in other examples of the present disclosure, the friction driving element 121 may also be designed in other shapes, for example, its cross-sectional shape may be designed as a trapezoid, which is not limited in the present disclosure.

It is worth mentioning that when the number of the friction driving elements 121 exceeds 2, that is, when it is greater than or equal to 3, preferably, the at least 3 friction driving elements 121 are equidistantly arranged, which is helpful to improve the driving stability of the piezoelectric actuator 100.

Further, as shown in FIG. 16, in this embodiment, when the piezoelectric actuator 100 is not turned on, a plurality of end surfaces of the plurality of friction driving elements 121 at a second end opposite to the first end are on the same plane. For example, in the example illustrated in FIG. 15, the end surfaces of the plurality of friction driving elements 121 at the second end are on the same horizontal plane. That is, in this embodiment, the end surfaces of the second ends of the plurality of friction driving elements 121 form the same plane. Correspondingly, in some embodiments of the present disclosure, a layer of friction material may be further applied on the plane (that is, the plane defined by the end surfaces of the plurality of friction driving elements 121 at the second end) to increase frictional force.

It is worth mentioning that in practical applications, usually, a mover is further arranged on the upper surface of the friction driving portion 120, so that the traveling wave or standing wave driving force provided by the friction driving portion 120 is transmitted through the mover and acts on the driven object. That is, a friction actuating portion 130 (the friction actuating portion 130 serving as the mover) is arranged between the friction driving portion 120 and the driven object, so that when the piezoelectric actuator 100 is turned on, the traveling wave or standing wave motion of the friction driving portion 120 will drive the friction actuating portion 130 to move linearly. Specifically, the linear movement direction of the friction actuating portion 130 is opposite to the advancing direction of the traveling wave or standing wave of the friction driving portion 120.

In order to ensure that the traveling wave or standing wave driving force provided by the friction driving portion 120 can act on the friction actuating portion 130, it is necessary to ensure that a certain prepressing force is applied between the friction actuating portion 130 and the piezoelectric actuator 100, so that the friction driving portion 120 can be in contact with the friction actuating portion 130. Thus, the traveling wave or standing wave driving force provided by the friction driving portion 120 can be transmitted to the friction actuating portion 130 more efficiently.

Figure 18:
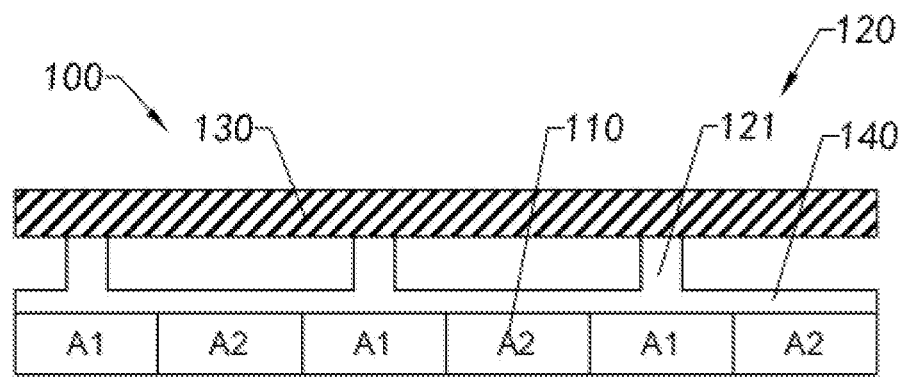
FIG. 18 illustrates a schematic view of a variant of the piezoelectric actuator according to the embodiment of the present disclosure.

FIG. 18 illustrates a schematic view of a variant of the piezoelectric actuator 100 according to the embodiment of the present disclosure. As shown in FIG. 18, in this embodiment, the piezoelectric actuator 100 further includes a friction connection layer 140 stacked on the piezoelectric active portion 110, and each of the friction driving elements 121 is coupled to the piezoelectric active portion 110 in such a manner that its first end is fixed to the friction connection layer 140. In this way, the deformation of the piezoelectric active portion 110 can be better transmitted through the friction connection layer 140 to the friction driving portion 120. In particular, in this embodiment, the friction driving element 121 and the friction connection layer 140 may have an integrated structure. Of course, in some examples, the friction driving element 121 and the friction connection layer 140 may have a split structure, that is, they are separate components.

Further, in the embodiment of the present disclosure, the piezoelectric actuator 100 has a relatively more optimized size. Quantitatively, the length dimension of the piezoelectric actuator 100 is less than or equal to 20 mm, preferably less than or equal to 10 mm, and for example, it may be 6 mm or 4.2 mm. The width dimension of the piezoelectric actuator 100 is less than or equal to 1 mm, preferably, less than or equal to 0.7 mm. The height dimension of the piezoelectric actuator 100 is less than or equal to 1 mm. Here, the height dimension of the piezoelectric actuator 100 is determined by the dimensions of the piezoelectric active portion 110 and the friction driving portion 120.

Compared with a traditional electromagnetic driver, the piezoelectric actuator 100 has the advantages of small size, large driving force and high accuracy. Quantitatively, the piezoelectric actuator 100 according to the embodiment of the present disclosure can provide a driving force ranging from 0.6N to 2 N, which is sufficient to drive a component with a weight more than 100 mg.

In addition to being able to provide a relatively large driving force, the piezoelectric actuator 100 also has other advantages over the traditional electromagnetic motor scheme and memory alloy motor scheme, including but not limited to: a relatively small size (with a slender shape), better response accuracy, a relatively simpler structure, relatively simpler driving control, high product consistency, no electromagnetic interference, a relatively larger stroke, short stabilization time, a relatively smaller weight, etc.

Specifically, the camera module requires that the configured driver has characteristics such as a long driving stroke and good alignment accuracy. In the existing voice coil motor scheme, in order to ensure the linearity of motion, it is necessary to design additional guide rods or ball guide rails; it is also necessary to adapt large-sized driving magnets/coils at the side part of the lens; and it is also necessary to set up auxiliary positioning devices such as balls, spring leaf, and suspension wires. In order to accommodate more components, ensure the structural strength and reserve structural gaps, it often leads to the larger lateral dimension of the module, the complicated structural design, and the heavier weight of the module. The memory alloy motor scheme is limited by the relatively small stroke that the memory alloy scheme can provide in the same proportion, and there are also reliability risks such as potential disconnection.

The piezoelectric actuator 100 has a relatively simple structure, and the assembly structure is simpler. In addition, the size of the piezoelectric active portion 110, the friction driving portion 120 and other elements is substantially unrelated to the size of the motion stroke. Therefore, in optical zoom products, the piezoelectric actuator 100 can realize the advantages of large driving force, small size, and small weight. Also, it is designed to match a larger stroke or a heavier component weight, and the integration degree in the design is also higher.

Further, the piezoelectric actuator 100 pushes the object to be pushed to perform micron-scale motion in a frictional contact manner. Compared with the non-contact manner of driving the object to be pushed in the electromagnetic scheme, in which it needs to rely on electromagnetic force to counteract gravity and frictional force, it has the advantages of greater driving force, greater displacement and lower power consumption, also has higher control accuracy, and can realize high-accuracy continuous zooming. Moreover, when there are a plurality of motor mechanisms, the piezoelectric actuator 100 does not have a magnet coil structure, so there is no magnetic interference problem. In addition, the piezoelectric actuator 100 can be self-locked through the frictional force between the components, and thus, the vibration and noise of the camera module during optical image stabilization can be reduced.

Figure 15:
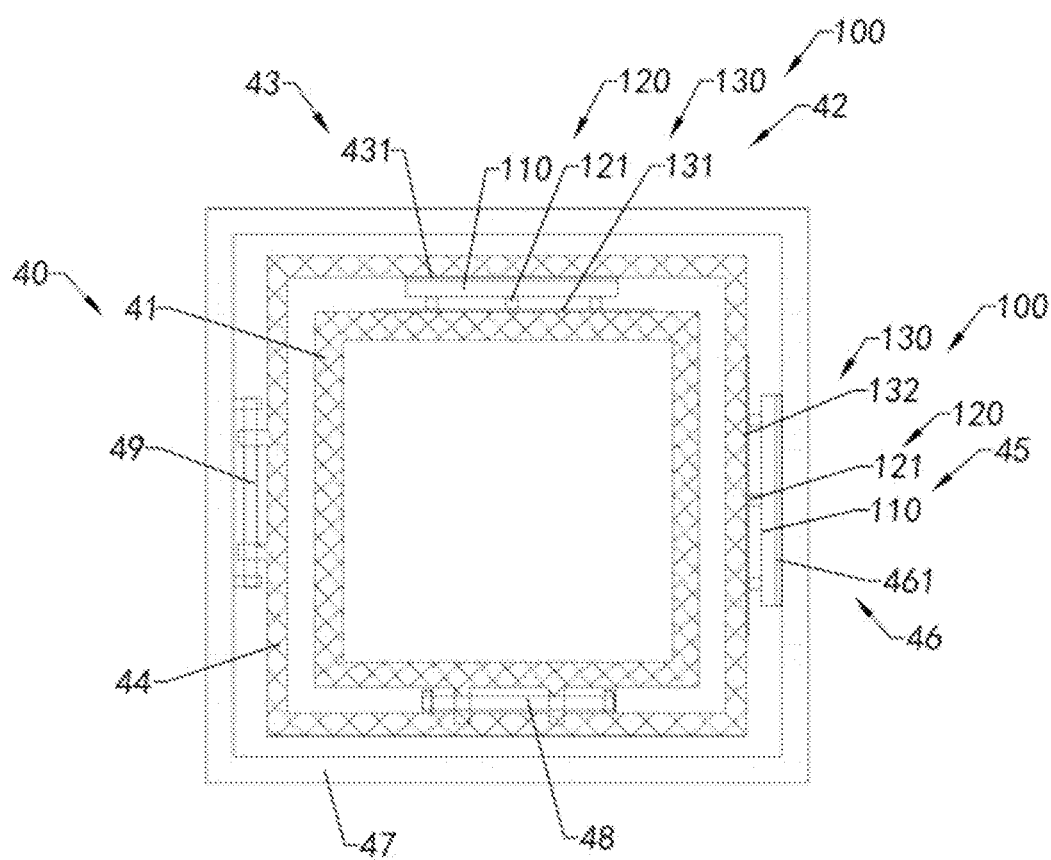
FIG. 15 illustrates another schematic view of the camera module according to the embodiment of the present disclosure.

After the piezoelectric actuator 100 is selected as a driver to drive the photosensitive assembly 10 for optical image stabilization, specifically, as shown in FIGS. 13 and 15, in this embodiment, the driving assembly 40 includes a first carrying frame 41, a first driving element 42, a first prepressing component 43, a second carrying frame 44, a second driving element 45, a second prepressing component 46, and an outer frame 47, wherein the first driving element 42 and the second driving element 45 are designed as the piezoelectric actuator 100.

Correspondingly, as shown in FIGS. 13 and 15, in this embodiment, the photosensitive assembly 10 is mounted on the first carrying frame 41, and the first driving element 42 is abutted against the first carrying frame 41 in a frictional contact manner through the first prepressing component 43, and is configured to drive the first carrying frame 41 to bring the photosensitive assembly 10 to move in a plane perpendicular to the optical axis for optical image stabilization in a first direction. The second carrying frame 44 is externally arranged on the first carrying frame 41, wherein the second driving element 45 is abutted against the second carrying frame 44 in a frictional contact manner through the second prepressing component 46, and is configured to drive the second carrying frame 44 so as to bring the first carrying frame 41 to bring the photosensitive assembly 10 in a plane perpendicular to the optical axis for optical image stabilization in a second direction, the first direction being perpendicular to the second direction. In one example, the first direction is an X-axis direction, and the second direction is a Y-axis direction.

Here, the first driving element 42 being abutted against the first carrying frame 41 in a frictional contact manner means that: there is a prepressing force between the friction driving portion 120 of the first driving element 42 and the first carrying frame 41, so that the friction driving portion 120 of the first driving element 42 can drive the first carrying frame 41 by means of friction driving. Moreover, the prepressing force between the friction driving portion 120 of the first driving element 42 and the first carrying frame 41 may be a direct prepressing force or an indirect prepressing force, wherein the direct prepressing force means that the friction driving portion 120 of the first driving element 42 is in direct contact with the first carrying frame 41 to generate a prepressing force between the two; and the indirect prepressing force means that although the friction driving portion 120 of the first driving element 42 is not in direct contact with the first carrying frame 41, there is still a prepressing force between the two, so that the friction driving portion 120 of the first driving element 42 can drive the first carrying frame 41 by means of friction driving.

Correspondingly, the second driving element 45 being abutted against the second carrying frame 44 in a frictional contact manner means that: there is a prepressing force between the friction driving portion 120 of the second driving element 45 and the second carrying frame 44, and thus the friction driving portion 120 of the second driving element 45 can drive the second carrying frame 44 by means of friction driving. Moreover, the prepressing force between the friction driving portion 120 of the second driving element 45 and the second carrying frame 44 may be a direct prepressing force or an indirect prepressing force, wherein the direct prepressing force means that the friction driving portion 120 of the second driving element 45 is in direct contact with the second carrying frame 44 to generate a prepressing force between the two; and the indirect prepressing force means that although the friction driving portion 120 of the second driving element 45 is not in direct contact with the second carrying frame 44, there is still a prepressing force between the two, so that the friction driving portion 120 of the second driving element 45 can drive the second carrying frame 44 by means of friction driving.

More specifically, in this embodiment, as shown in FIG. 15, the first driving element 42 is sandwiched between the first carrying frame 41 and the second carrying frame 44 through the first prepressing component 43, so that the first driving element 42 is abutted against the first carrying frame 41 in a frictional contact manner.

Correspondingly, in this embodiment, the first prepressing component 43 includes a first elastic element 431, and the first elastic element 431 is arranged between the piezoelectric active portion 110 of the first driving element 42 and the second carrying frame 44, so as to force the first driving element 42 to abut against the first carrying frame 41 in a frictional contact manner through an elastic force of the first elastic element 431. In this embodiment, the friction driving portion 120 of the first driving element 42 is directly in contact with the surface of the outer side wall of the first carrying frame 41, and correspondingly, the elastic force provided by the first elastic element 431 can force the friction driving portion 120 of the first driving element 42 to be in contact with the surface of the outer side wall of the first carrying frame 41 to form a frictional contact relationship between the two. In this way, after the first driving element 42 is turned on, the friction driving portion 120 of the first driving element 42 can drive the first carrying frame 41 to move along the first direction by means of friction driving, so as to bring the photosensitive assembly 10 to move along the first direction for optical image stabilization in the first direction.

In a specific example of the present disclosure, the first elastic element 431 is designed as an adhesive having elasticity, that is, the first elastic element 431 is designed as glue having elasticity after being cured. Correspondingly, during the installation process, a layer of adhesive with a thickness of 10 um to 50 um may be applied between the surface of the inner side wall of the second carrying frame 44 and the piezoelectric active portion 110 of the first driving element 42, so as to form the first elastic element 431 arranged between the piezoelectric active portion 110 of the first driving element 42 and the second carrying frame 44 after the adhesive is cured and molded. It should be understood that, in this example, the first elastic element 431 can also enable the first driving element 42 to be fixed on the surface of the inner side wall of the second carrying frame 44 while providing the prepressing force. Preferably, the first elastic member 431 has relatively high flatness, that is, when applying the adhesive, it is ensured as much as possible that the applied adhesive has relatively high flatness and uniformity, so that the first driving element 42 can be flatly fixed on the surface of the inner side wall of the second carrying frame 44, thereby improving the driving stability of the first driving element 42.

Corresponding, in this embodiment, as shown in FIG. 15, the second driving element 45 is sandwiched between the second carrying frame 44 and the outer frame 47 through the second prepressing component 46, so that the second driving element 45 is abutted against the second carrying frame 44 in a frictional contact manner. Moreover, it should be noted that, as shown in FIG. 13, the lens carrier of the lens assembly is carried on the outer frame 47.

Further, as shown in FIG. 15, in this embodiment, the second prepressing component 46 includes a second elastic element 461, and the second elastic element 461 is arranged between the piezoelectric active portion 110 of the second driving element 45 and the outer frame 47, so as to force the second driving element 45 to abut against the second carrying frame 44 in a frictional contact manner through an elastic force of the second elastic element 461. Correspondingly, in this embodiment, the friction driving portion 120 of the second driving element 45 is directly in contact with the surface of the outer side wall of the second carrying frame 44, and correspondingly, the elastic force provided by the second elastic element 461 can force the friction driving portion 120 of the second driving element 45 to be in contact with the surface of the outer side wall of the second carrying frame 44 to form a frictional contact relationship between the two. In this way, after the second driving element 45 is turned on, the friction driving portion 120 of the second driving element 45 can drive the second carrying frame 44 to move along the second direction by means of friction driving, so as to bring the photosensitive assembly 10 to move along the second direction for optical image stabilization in the second direction.

In a specific example of the present disclosure, the second elastic element 461 is designed as an adhesive having elasticity, that is, the second elastic element 461 is designed as glue having elasticity after being cured. Correspondingly, during the installation process, a layer of adhesive with a thickness of 10 um to 50 um may be applied between the surface of the inner side wall of the outer frame 47 and the piezoelectric active portion 110 of the second driving element 45, so as to form the second elastic element 461 arranged between the piezoelectric active portion 110 of the second driving element 45 and the outer frame 47 after the adhesive is cured and molded. It should be understood that, in this example, the second elastic element 461 can also enable the second driving element 45 to be fixed on the surface of the inner side wall of the outer frame 47 while providing the prepressing force. Preferably, the second elastic member 461 has relatively high flatness, that is, when applying the adhesive, it is ensured as much as possible that the applied adhesive has relatively high flatness and uniformity, so that the second driving element 45 can be flatly fixed on the surface of the inner side wall of the outer frame 47, thereby improving the driving stability of the second driving element 45.

It is worth mentioning that, in other embodiments of the present disclosure, the first elastic element 431 and the second elastic element 461 may also be designed as elastic elements without viscosity, for example, rubber with the inherent characteristic of elasticity in the material itself, or a spring or leaf spring that produces elasticity due to deformation, etc., which is also not limited in the present disclosure.

In order to enable the first driving element 42 and the second driving element 45 to drive the first carrying frame 41 and the second carrying frame 44 more smoothly, as shown in FIG. 15, the driving assembly 40 further includes a first guiding mechanism 48 arranged between the first carrying frame 41 and the second carrying frame 44 and a second guiding mechanism 49 arranged between the second carrying frame 44 and the outer carrying frame 47, wherein the first guiding mechanism 48 is configured to guide the first carrying frame 41 to move along the first direction, and the second guiding mechanism 49 is configured to guide the second carrying frame 44 to move along the second direction.

More specifically, as shown in FIG. 15, in this embodiment, the first guiding mechanism 48 and the second guiding mechanism 49 are designed as guide rod structures. Correspondingly, the first guiding mechanism 48 includes a first guide rod arranged on the outer side wall of the first carrying frame 41 and extending along the first direction, wherein both ends of the first guide rod are fixed on the inner side wall of the second carrying frame 44. In particular, in this embodiment, the first guide rod and the first driving element 42 are oppositely arranged in the same direction. Thus, after the first driving element 42 is turned on, the first carrying frame 41 is guided to move along the direction in which the first guide rod extends, so as to improve the movement stability of the first carrying frame 41.

Correspondingly, in this embodiment, the second guiding mechanism 49 includes a second guide rod arranged on the outer side wall of the second carrying frame 44 and extending along the second direction, wherein both ends of the second guide rod are fixed on the inner side wall of the outer frame 47. In particular, in this embodiment, the second guide rod and the second driving element 45 are oppositely arranged in the same direction. Thus, after the second driving element 45 is turned on, the second carrying frame 44 is guided to move along the direction in which the second guide rod extends, so as to improve the movement stability of the second carrying frame 44.

It is worth mentioning that, in other embodiments of the present disclosure, the first guiding mechanism 48 and the second guiding mechanism 49 may also be realized based on other principles, for example, through a rolling ball-rolling groove mechanism, a slider-sliding groove mechanism, etc., which is not limited in the present disclosure.

Figure 19:
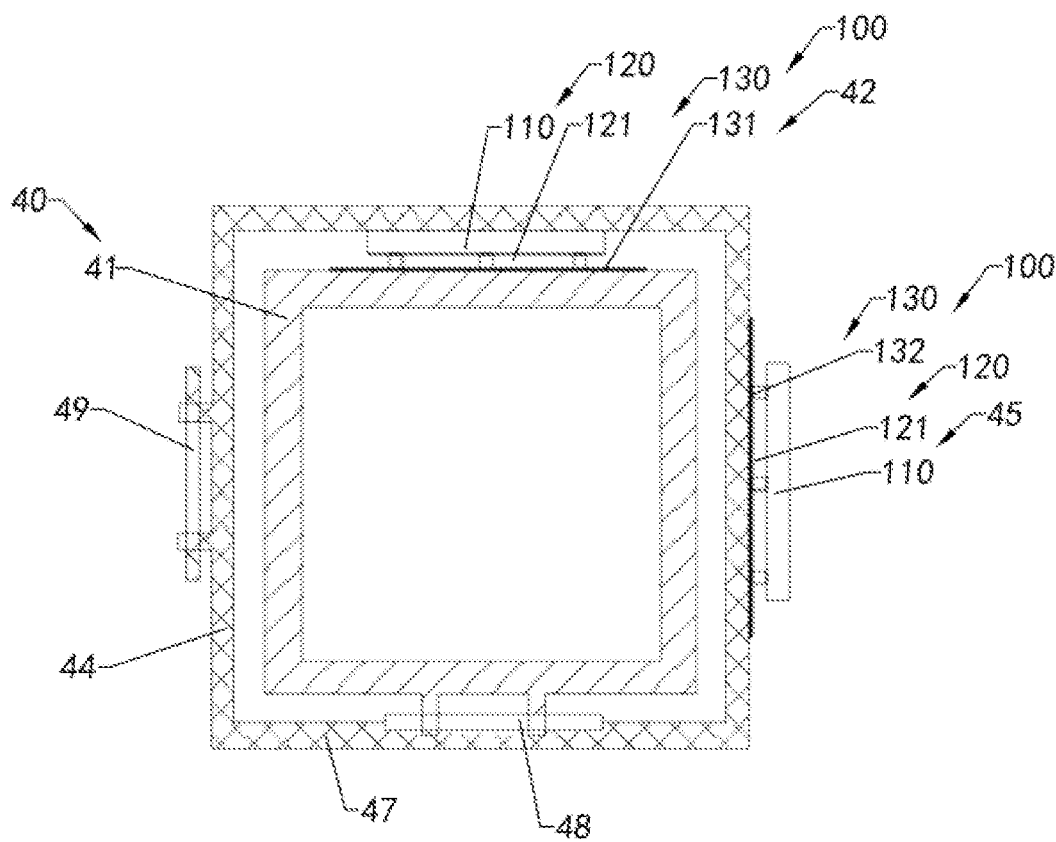
FIG. 19 illustrates a schematic view of a variant of the camera module according to the embodiment of the present disclosure.

In order to optimize the driving performance of the first driving element 42 and the second driving element 45, in other examples of the present disclosure, as shown in FIG. 19, the driving assembly 40 further includes a first friction actuating portion 131 and a second friction actuating portion 132, wherein the first friction actuating portion 131 is arranged between the first driving element 42 and the first carrying frame 41, the friction driving portion 120 of the first driving element 42 is in contact with the first friction actuating portion 131 under the action of the first prepressing component 43, and the first friction actuating portion 131 is in contact with the surface of the outer side wall of the first carrying frame 41. In this way, the friction driving force provided by the first driving element 42 can act on the first carrying frame 41 through the first friction actuating portion 131, so as to bring the first carrying frame 41 and the photosensitive assembly 10 to move along the first direction. That is, in this variant, the prepressing force between the friction driving portion 120 of the first driving element 42 and the first carrying frame 41 is an indirect prepressing force, that is, although the friction driving portion 120 of the first driving element 42 is not in direct contact with the first carrying frame 41, there is still a prepressing force between the two, so that the friction driving portion 120 of the first driving element 42 can drive the first carrying frame 41 by means of friction driving.

Correspondingly, the second friction actuating portion 132 is arranged between the second driving element 45 and the second carrying frame 44, and the friction driving portion 120 of the second driving element 45 is in contact with the second friction actuating portion 132 under the action of the second prepressing component 46, and the second friction actuating portion 132 is in contact with the surface of the outer wall of the second carrying frame 44. In this way, the friction driving force provided by the second driving element 45 can act on the second carrying frame 44 via the second friction actuating portion 132, so as to bring the second carrying frame 44, the first carrying frame 41 and the photosensitive assembly 10 to move along the second direction for optical image stabilization in the second direction.

More specifically, as shown in FIG. 13, in this embodiment, the first friction actuating portion 131 has a first surface and a second surface opposite to the first surface, wherein under the action of the first prepressing component 43, the first surface of the first friction actuating portion 131 is in contact with the surface of the outer side wall of the first carrying frame 41, and the second surface is in contact with the end face of at least one of the plurality of friction driving element 121 at the second end. In this way, the friction driving portion 120 of the first driving element 42 is in contact with the first friction actuating portion 131 and the first friction actuating portion 131 is in contact with the first carrying frame 41, so that the friction driving force provided by the first driving element 42 can act on the first carrying frame 41 via the first friction actuating portion 131. Correspondingly, the second friction actuating portion 132 has a third surface and a fourth surface opposite to the third surface, wherein under the action of the second prepressing component 46, the third surface of the second friction actuating portion 132 is in contact with the surface of the outer side wall of the second carrying frame 44, and the fourth surface is in contact with the end surface of at least one of the plurality of friction driving elements 121 at the second end. In this way, the friction driving portion 120 of the second driving element 45 is in contact with the second friction actuating portion 132 and the second friction actuating portion 132 is in contact with the second carrying frame 44, so that the friction driving force provided by the second driving element 45 can act on the second carrying frame 44 via the second friction actuating portion 132.

It is worth mentioning that, although in the embodiment illustrated in FIG. 16, the first friction actuating portion 131 and the second friction actuating portion 132, as a separate component, are arranged between the first driving element 42 and the first carrying frame 41, and between the second driving element 45 and the second carrying frame 44, respectively, for example, the first friction actuating portion 131 is designed as a separate component and is attached to the side surface of the first carrying frame 41, or, the second friction actuating portion 132 is designed as a separate component and is attached to the side surface of the second carrying frame 44. For another example, the first friction actuating portion 131 is designed as a coating coated on the side surface of the first carrying frame 41, or the second friction actuating portion 132 is designed as a coating coated on the side surface of the second carrying frame 44. It should be understood that, in other examples of the present disclosure, the first friction actuating portion 131 may also be integrally formed on the surface of the outer side wall of the first carrying frame 41, that is, the first friction actuating portion 131 and the first carrying frame 41 has an integrated structure. Of course, in other examples of the present disclosure, the second friction actuating portion 132 may also be integrally formed on the surface of the outer side wall of the second carrying frame 44, that is, the second friction actuating portion 132 and the second carrying frame 44 has an integrated structure.

It is also worth mentioning that, in this variant, the length of the first friction actuating portion 131 is greater than the length of the first driving element 42, and the length of the second friction actuating portion 131 is greater than the length of the second driving element 43. Thus, when the first carrying frame 31 and the second carrying frame 44 are driven in a friction driving manner through the first driving element 41 and the second driving element 42, respectively, the first carrying frame 31 and the second carrying frame 44 have enough strokes to ensure the movement linearity of the first carrying frame 31 and the second carrying frame 44. Of course, in other examples of the present disclosure, the length of the first friction actuating portion 131 may also be less than or equal to the length of the first driving element 42, and the length of the second friction actuating portion 132 may also be less than or equal to the length of the second driving element 43, which is not limited in the present disclosure.

Figure 20:
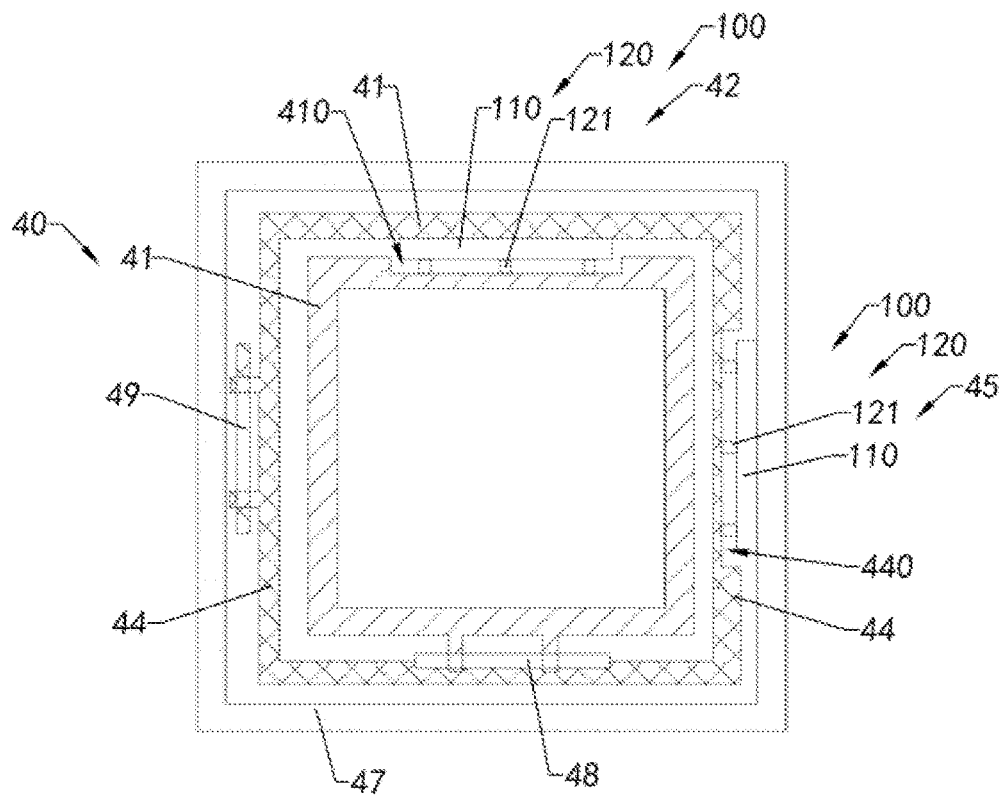
FIG. 20 illustrates a schematic view of another variant of the camera module according to the embodiment of the present disclosure.

FIG. 20 illustrates a schematic view of another variant of the camera module according to the embodiment of the present disclosure. Compared with the example illustrated in FIG. 16, in this variant example, the first carrying frame 41 has a first groove 410 recessedly formed on its surface, and the friction driving portion 120 of the first driving element 42 is arranged in the first groove 410; and the second carrying frame 44 has a second groove 440 recessedly formed on its surface, and the friction driving portion 120 of the second driving element 45 is arranged in the second groove 440. That is, in this variant, the first driving element 42 is at least partially accommodated in the first groove 410, and the second driving element 45 is at least partially accommodated in the second groove 440. Preferably, a part of the piezoelectric active portion 110 of the first driving element 42 is accommodated in the first groove 410, and a part of the piezoelectric active portion 110 of the second driving element 45 is accommodated in the second groove 440.

In this way, when the first driving element 42 drives the first carrying frame 41 in the first groove 410, the first groove 410 itself forms a guiding groove for guiding the first carrying frame 41 to move. That is, in this variant, the first groove 410 not only provides an installation space for the installation of the first driving element 42, but also itself forms a guiding structure for guiding the movement of the first carrying frame 41 (in other words, regulating the movement of the first driving element 42). Likewise, when the second driving element 45 drives the second carrying frame 44 in the second groove 440, the second groove 440 itself forms a guiding groove for guiding the movement of the second carrying frame 44. That is, in this variant, the second groove 440 not only provides an installation space for the installation of the first driving element 42, but also itself forms a guiding structure for guiding the movement of the second carrying frame 44 (in other words, regulating the movement of the second driving element 45).

Particularly, in this variant, the length dimensions of the first driving element 42 and the second driving element 45 are smaller than those of the first groove 410 and the second groove 440, and the width dimensions of the first driving element 42 and the second driving element 45 are slightly smaller than or equal to those of the first groove 410 and the second groove 440.

Figure 21:
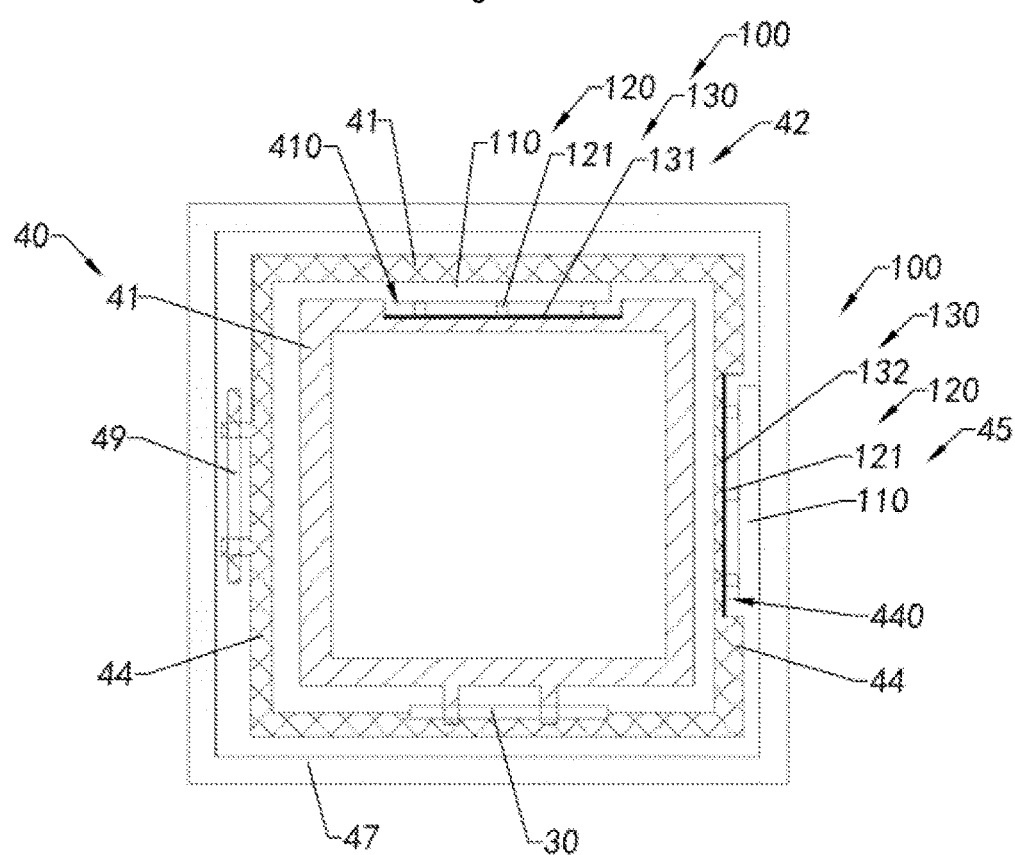
FIG. 21 illustrates a schematic view of still another variant of the camera module according to the embodiment of the present disclosure.

FIG. 21 illustrates a schematic view of still another variant of the camera module according to the embodiment of the present disclosure. Compared with the example illustrated in FIG. 19, in this variant example, the first carrying frame 41 has a first groove 410 recessedly formed on its surface, and the first friction actuating portion 131 is arranged in the first groove 410; and the second carrying frame 44 has a second groove 440 recessedly formed on its surface, and the second friction actuating portion 132 is arranged in the second groove 440. That is, in this variant, the first driving element 42 is at least partially accommodated in the first groove 410, and the second driving element 45 is at least partially accommodated in the second groove 440. Preferably, a part of the piezoelectric active portion 110 of the first driving element 42 is accommodated in the first groove 410, and a part of the piezoelectric active portion 110 of the second driving element 45 is accommodated in the second groove 440.

In this way, when the first driving element 42 drives the first carrying frame 41 in the first groove 410, the first groove 410 itself forms a guiding groove for guiding the first carrying frame 41 to move. That is, in this variant, the first groove 410 not only provides an installation space for the installation of the first driving element 42, but also itself forms a guiding structure for guiding the movement of the first carrying frame 41 (in other words, regulating the movement of the first driving element 42). Likewise, when the second driving element 45 drives the second carrying frame 44 in the second groove 440, the second groove 440 itself forms a guiding groove for guiding the movement of the second carrying frame 44. That is, in this variant, the second groove 440 not only provides an installation space for the installation of the first driving element 42, but also itself forms a guiding structure for guiding the movement of the second carrying frame 44 (in other words, regulating the movement of the second driving element 45).

Particularly, in this variant, the length dimensions of the first driving element 42 and the second driving element 45 are smaller than those of the first groove 410 and the second groove 440, and the width dimensions of the first driving element 42 and the second driving element 45 are slightly smaller than or equal to those of the first groove 410 and the second groove 440.

Figures 22, 23:
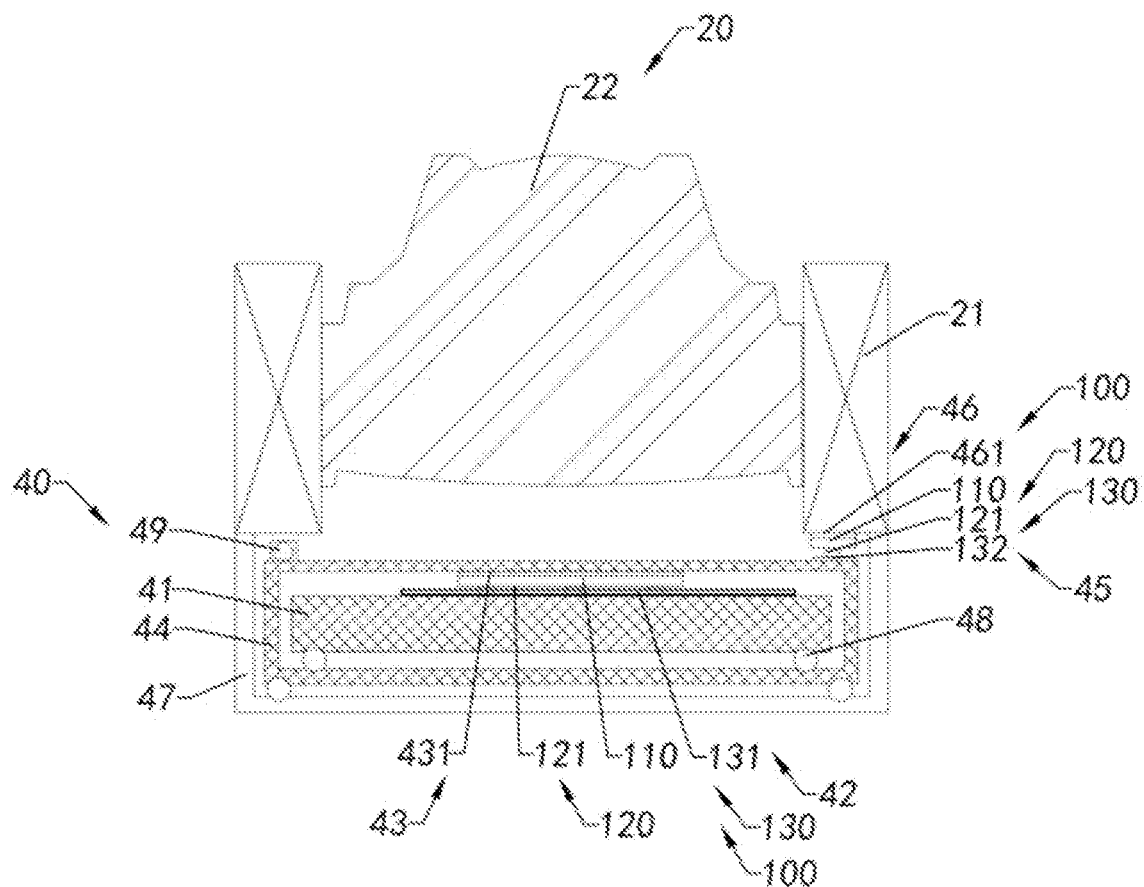
FIG. 22 illustrates a schematic view of still another variant of the camera module according to the embodiment of the present disclosure.
FIG. 23 illustrates a schematic view of still another variant of the camera module according to the embodiment of the present disclosure.

FIG. 22 illustrates a schematic view of still another variant of the camera module according to the embodiment of the present disclosure. Compared with the example illustrated in FIG. 13, in this variant, the arrangement of the first driving element 42 and the second driving element 45 is changed.

Specifically, in the example illustrated in FIGS. 13 and 15, the first driving element 42 is located on the side part of the first carrying frame 41, and the second driving element 45 is located on the side part of the second carrying frame 44. In contrast, as shown in FIG. 22, in this variant, the first driving element 42 is located on the upper part of the first carrying frame 41, and the second driving element 45 is located on the upper part of the second carrying frame 44.

In a specific example of this variant, the first driving element 42 is sandwiched between the first carrying frame 41 and the second carrying frame 44 up and down through the first prepressing component 43, so that the first driving element 42 is abutted against the first carrying frame 41 in a frictional contact manner. The second driving element 45 is sandwiched between the second carrying frame 44 and the lens assembly 20 up and down through the second prepressing component 46, so that the second driving element 45 is abutted against the second carrying frame 44 in a frictional contact manner. Of course, in this embodiment, the outer frame 47 may also be provided with an inner extension arm, so that the second driving element 45 is sandwiched between the second carrying frame 44 and the outer frame 47 up and down through the second prepressing component 46.

Correspondingly, the driving assembly 40 further includes a first guiding mechanism 48 arranged between the first carrying frame 41 and the second carrying frame 44, and a second guiding mechanism 49 arranged between the second carrying frame and the outer frame 47. However, unlike the example illustrated in FIGS. 13 and 15, in this variant, the first guiding mechanism 48 and the second guiding mechanism 49 are designed as a rolling ball-rolling groove mechanism, as shown in FIG. 23.

Figure 24:
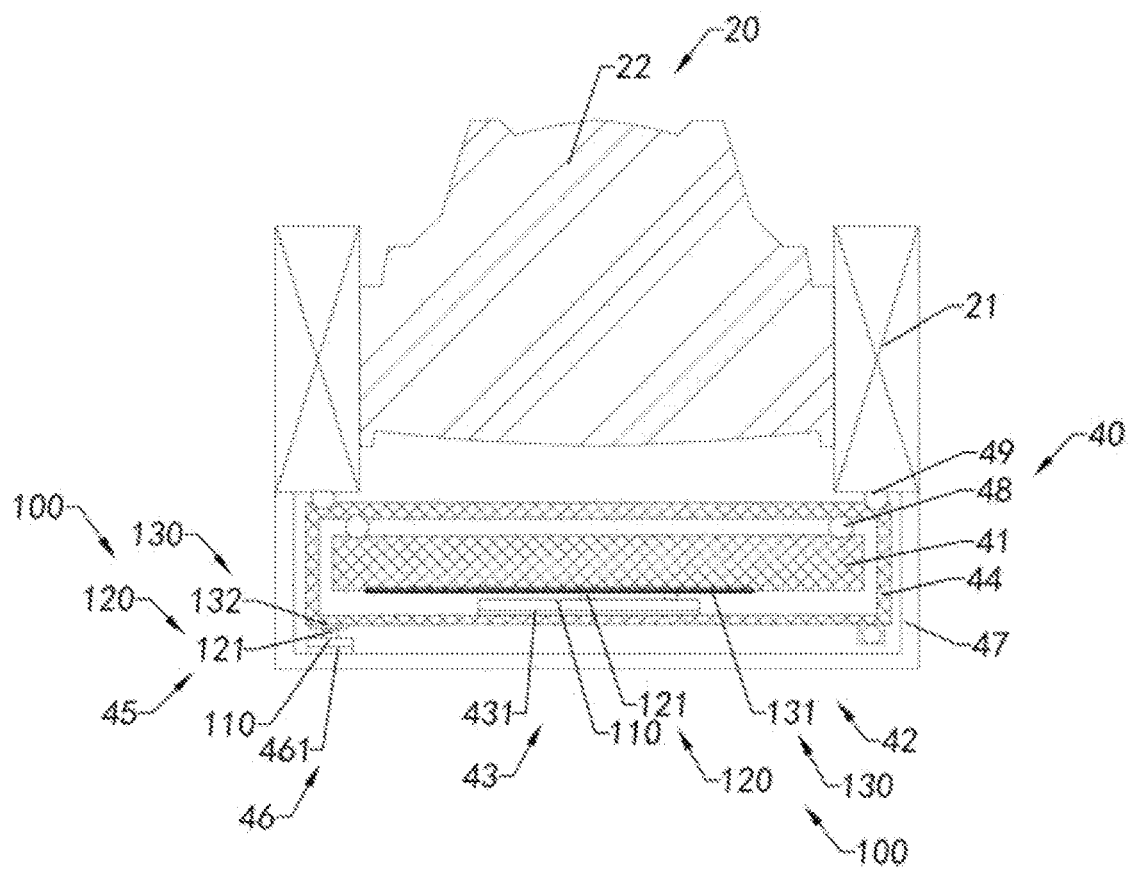
FIG. 24 illustrates a schematic view of still another variant of the camera module according to the embodiment of the present disclosure.

FIG. 24 illustrates a schematic view of still another variant of the camera module according to the embodiment of the present disclosure. Compared with the example illustrated in FIG. 13, in this variant, the arrangement of the first driving element 42 and the second driving element 45 is changed again.

Specifically, as shown in FIG. 24, in this variant, the first driving element 42 is located on the lower part of the first carrying frame 41, and the second driving element 45 is located on the lower part of the second carrying frame 44.

In a specific example of this variant, the first driving element 42 is sandwiched between the first carrying frame 41 and the second carrying frame 44 up and down through the first prepressing component 43, so that the first driving element 42 is abutted against the first carrying frame 41 in a frictional contact manner. The second driving element 45 is sandwiched between the second carrying frame 44 and the outer frame 47 up and down through the second prepressing component 46, so that the second driving element 45 is abutted against the second carrying frame 44 in a frictional contact manner.

Correspondingly, the driving assembly 40 further includes a first guiding mechanism 48 arranged between the first carrying frame 41 and the second carrying frame 44, and a second guiding mechanism 49 arranged between the second carrying frame and the outer frame 47. However, unlike the example illustrated in FIGS. 13 and 15, in this variant, the first guiding mechanism 48 and the second guiding mechanism 49 are designed as a rolling ball-rolling groove mechanism, as shown in FIG. 23.

Figure 25:
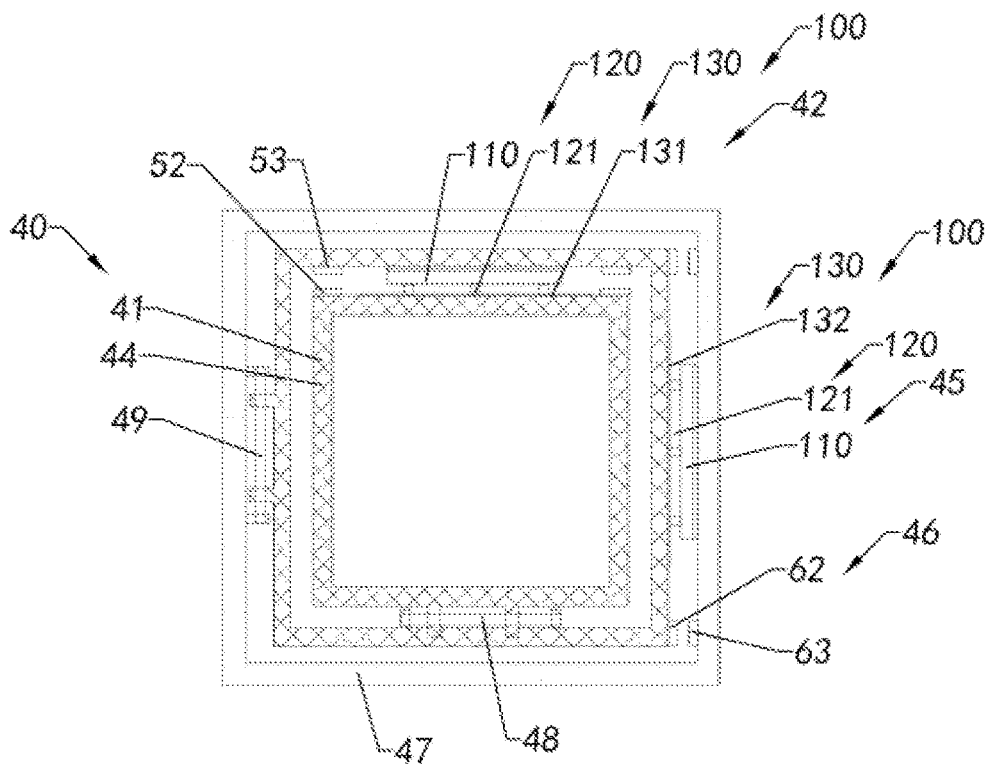
FIG. 25 illustrates a partial schematic view of still another variant of the camera module according to the embodiment of the present disclosure.

It is worth mentioning that, in other variants of the present disclosure, the structural configuration of the first prepressing component 43 and the second prepressing component 46 may also be adjusted. Specifically, as shown in FIG. 25, in other examples of the present disclosure, the first prepressing component 43 includes a first magnetic attraction element 52 arranged on the first carrying frame 41 and a second magnetic attraction element 53 arranged on the second carrying frame 44 and corresponding to the first magnetic attraction element 52, as so to force the first driving element 42 to abut against the first carrying frame 41 in a frictional contact manner through an magnetic attraction action between the first magnetic attraction element 52 and the second magnetic attraction element 53.

In this variant, the first magnetic attraction element 52 and the second magnetic attraction element 53 refer to magnetic attraction assemblies that can attract each other. For example, the first magnetic attraction element 52 may be designed as a magnet, and the second magnetic attraction element 53 may be designed as a magnetic component, for example, a material made of a metal such as iron, nickel, cobalt or the like. For another example, the first magnetic attraction element 52 may be designed as a magnet, and the second magnetic attraction element 53 may also be designed as a magnet.

The second prepressing component 46 includes a third magnetic attraction element 62 arranged on the second carrying frame 44 and a fourth magnetic attraction element 63 arranged on the lens assembly 20 and corresponding to the third magnetic attraction element 62, as so to force the second driving element 45 to abut against the second carrying frame 44 in a frictional contact manner through an magnetic attraction action between the third magnetic attraction element 62 and the fourth magnetic attraction element 63.

In this variant, the third magnetic attraction element 62 and the fourth magnetic attraction element 63 refer to magnetic attraction assemblies that can attract each other. For example, the third magnetic attraction element 62 may be designed as a magnet, and the fourth magnetic attraction element 63 may be designed as a magnetic component, for example, a material made of a metal such as iron, nickel, cobalt or the like. For another example, the third magnetic attraction element 62 may be designed as a magnet, and the fourth magnetic attraction element 63 may also be designed as a magnet.

In summary, the camera module based on the embodiment of the present disclosure is explained, wherein the camera module adopts the piezoelectric actuator 100 as a driver, which can not only meet the driving requirements of the camera module for optical performance adjustment, but also meet the development demands of the camera module for lightness and thinness.

Although the camera module is a traditional upright camera module as an example in the embodiment of the present disclosure, it should be understood by those of ordinary skill in the art that the piezoelectric actuator 100 according to the embodiment of the present disclosure may also be used as a driver in a periscope camera module, which is not limited in the present disclosure.

It should be understood by those skilled in the art that the embodiments of the present invention shown in the above description and the drawings are only used as examples and do not limit the present invention. The objects of the present invention have been fully and effectively achieved. The functional and structural principles of the present invention have been shown and described in the embodiments, and the implementations of the present invention may be changed or modified in any way without departing from the principles.

What is claimed is:

1. A camera module, comprising:
a photosensitive assembly, comprising a circuit board and a photosensitive chip electrically connected to the circuit board;
a frame carrier assembly mounted on the photosensitive assembly, comprising a first frame carrier;
an optical camera lens held on a photosensitive path of the photosensitive assembly in such a manner that it is mounted in the first frame carrier of the frame carrier assembly, wherein the optical camera lens is provided with an optical axis; and
a driving assembly, comprising a first driving element and a first prepressing component, wherein the first driving element is abutted against the first frame carrier in a frictional contact manner through the first prepressing component, and is configured to drive the first frame carrier so as to bring the optical camera lens to move in a plane perpendicular to the optical axis for optical image stabilization in a first direction;
wherein the frame carrier assembly further comprises a second frame carrier externally arranged on the first frame carrier and an outer frame carrier externally arranged on the second frame carrier, the driving assembly further comprises a second driving element and a second prepressing component, wherein the second driving element is abutted against the second frame carrier in a frictional contact manner through the second prepressing component, and is configured to drive the second frame carrier so as to bring the first frame carrier to bring the optical camera lens to move in a plane perpendicular to the optical axis for optical image stabilization in a second direction, the first direction being perpendicular to the second direction;
wherein the first driving element and the second driving element are designed as a piezoelectric actuator, respectively, and the piezoelectric actuator comprises a piezoelectric active portion and a friction driving portion that is driveably connected to the piezoelectric active portion, wherein after the piezoelectric actuator is turned on, the friction driving portion is configured to provide a driving force for driving the first frame carrier or the second frame carrier under the action of the piezoelectric active portion;
wherein the piezoelectric active portion has multiple sets of first polarization regions and second polarization regions alternately arranged, and the first polarization region and the second polarization region have a same polarization direction, wherein after the piezoelectric actuator is turned on, the multiple sets of first polarization regions and second polarization regions alternately arranged deform in different directions to bring the friction driving portion to move in a traveling wave or standing wave manner along a preset direction, so as to provide a driving force for driving the first frame carrier or the second frame carrier, wherein the multiple sets of first polarization regions and second polarization regions alternately arranged are on a same straight line.

2. A camera module, comprising:
a photosensitive assembly, comprising a circuit board and a photosensitive chip electrically connected to the circuit board;
a frame carrier assembly mounted on the photosensitive assembly, comprising a first frame carrier;
an optical camera lens held on a photosensitive path of the photosensitive assembly in such a manner that it is mounted in the first frame carrier of the frame carrier assembly, wherein the optical camera lens is provided with an optical axis; and
a driving assembly, comprising a first driving element and a first prepressing component, wherein the first driving element is abutted against the first frame carrier in a frictional contact manner through the first prepressing component, and is configured to drive the first frame carrier so as to bring the optical camera lens to move in a plane perpendicular to the optical axis for optical image stabilization in a first direction;
wherein the frame carrier assembly further comprises a second frame carrier externally arranged on the first frame carrier and an outer frame carrier externally arranged on the second frame carrier, the driving assembly further comprises a second driving element and a second prepressing component, wherein the second driving element is abutted against the second frame carrier in a frictional contact manner through the second prepressing component, and is configured to drive the second frame carrier so as to bring the first frame carrier to bring the optical camera lens to move in a plane perpendicular to the optical axis for optical image stabilization in a second direction, the first direction being perpendicular to the second direction;
wherein the first driving element and the second driving element are designed as a piezoelectric actuator, respectively, and the piezoelectric actuator comprises a piezoelectric active portion and a friction driving portion that is driveably connected to the piezoelectric active portion, wherein after the piezoelectric actuator is turned on, the friction driving portion is configured to provide a driving force for driving the first frame carrier or the second frame carrier under the action of the piezoelectric active portion;
wherein the piezoelectric active portion has multiple sets of first polarization regions and second polarization regions alternately arranged, and the first polarization region and the second polarization region have opposite polarization directions, wherein after the piezoelectric actuator is turned on, the multiple sets of first polarization regions and second polarization regions alternately arranged deform in different directions to bring the friction driving portion to move in a traveling wave or standing wave manner along a preset direction, so as to provide a driving force for driving the first frame carrier or the second frame carrier, wherein the multiple sets of first polarization regions and second polarization regions alternately arranged are on a same straight line.

3. The camera module according to claim 2, wherein the friction driving portion comprises a plurality of friction driving elements spaced apart from each other, and a first end of each of the friction driving elements is coupled to the piezoelectric active portion, wherein the plurality of friction driving elements are located in a middle region of the piezoelectric active portion, wherein a plurality of end faces of the plurality of friction driving elements at a second end opposite to the first end are on a same plane.

4. The camera module according to claim 3, wherein the piezoelectric actuator further comprises a friction connection layer stacked on the piezoelectric active portion, and each of the friction driving elements is coupled to the piezoelectric active portion in such a manner that its first end is fixed to the friction connection layer.

5. The camera module according to claim 3, wherein the driving assembly further comprises a first friction actuating portion and a second friction actuating portion, the first friction actuating portion is arranged between the first driving element and the first frame carrier, and the second friction actuating portion is arranged between the second driving element and the second frame carrier, wherein the first friction actuating portion has a first surface and a second surface opposite to the first surface, the first surface is in contact with a surface of the first frame carrier, and the second surface is in contact with an end surface of at least one of the plurality of friction driving elements at the second end; and the second friction actuating portion has a third surface and a fourth surface opposite to the third surface, the third surface is in contact with a surface of the second frame carrier, and the fourth surface is in contact with an end surface of at least one of the plurality of friction driving elements at the second end.

6. The camera module according to claim 5, wherein the first driving element is sandwiched between the first frame carrier and the second frame carrier through the first prepressing component and the first friction actuating portion, so that the first driving element is abutted against the first frame carrier in a frictional contact manner.

7. The camera module according to claim 6, wherein the first driving element is located on a side part of the first frame carrier, wherein the second driving element is sandwiched between the second frame carrier and the outer frame carrier through the second prepressing component and the second friction actuating portion, so that the second driving element is abutted against the second frame carrier in a frictional contact manner, and wherein the second driving element is located on a side part of the second frame carrier.

8. The camera module according to claim 6, wherein the first driving element is located on an upper part of the first frame carrier, wherein the second driving element is sandwiched between the second frame carrier and the outer frame carrier through the second prepressing component and the second friction actuating portion, so that the second driving element is abutted against the second frame carrier in a frictional contact manner, and wherein the second driving element is located on an upper part of the second frame carrier.

9. The camera module according to claim 6, wherein the first driving element is located on a lower part of the first frame carrier, wherein the driving assembly further comprises an outer frame carrier externally arranged on the second frame carrier, wherein the second driving element is sandwiched between the second frame carrier and the outer frame carrier through the second prepressing component and the second friction actuating portion, so that the second driving element is abutted against the second frame carrier in a frictional contact manner, and wherein the second driving element is located on a low part of the second frame carrier.

10. The camera module according to claim 7, wherein the driving assembly further comprises a first guiding mechanism arranged between the first frame carrier and the second frame carrier, and a second guiding mechanism arranged between the second frame carrier and the outer frame carrier.

11. The camera module according to claim 10, wherein the first prepressing component comprises a first elastic element, and the first elastic element is arranged between the piezoelectric active portion of the first driving element and the second frame carrier, so as to force the first driving element to abut against the first frame carrier in a frictional contact manner through an elastic force of the first elastic element; and the second prepressing element comprises a second elastic element, and the second elastic element is arranged between the piezoelectric active portion of the second driving element and the outer frame carrier, so as to force the second driving element to abut against the second frame carrier in a frictional contact manner through an elastic force of the second elastic element.

12. The camera module according to claim 8, wherein the first prepressing component comprises a first elastic element, and the first elastic element is arranged between the piezoelectric active portion of the first driving element and the second frame carrier, so as to force the first driving element to abut against the first frame carrier in a frictional contact manner through an elastic force of the first elastic element; and the second prepressing element comprises a second elastic element, and the second elastic element is arranged between the piezoelectric active portion of the second driving element and the outer frame carrier, so as to force the second driving element to abut against the second frame carrier in a frictional contact manner through an elastic force of the second elastic element.

13. The camera module according to claim 9, wherein the first prepressing component comprises a first elastic element, and the first elastic element is arranged between the piezoelectric active portion of the first driving element and the second frame carrier, so as to force the first driving element to abut against the first frame carrier in a frictional contact manner through an elastic force of the first elastic element; and the second prepressing element comprises a second elastic element, and the second elastic element is arranged between the piezoelectric active portion of the second driving element and the outer frame carrier, so as to force the second driving element to abut against the second frame carrier in a frictional contact manner through an elastic force of the second elastic element.

14. The camera module according to claim 11, wherein the first elastic element and the second elastic element are designed as adhesives having elasticity, wherein thickness dimensions of the first elastic element and the second elastic element are between 10 μm and 50 μm.

15. The camera module according to claim 10, wherein the first prepressing component comprises a first magnetic attraction element arranged on the first frame carrier and a second magnetic attraction element arranged on the second frame carrier and corresponding to the first magnetic attraction element, as so to force the first driving element to abut against the first frame carrier in a frictional contact manner through an magnetic attraction action between the first magnetic attraction element and the second magnetic attraction element; and the second prepressing component comprises a third magnetic attraction element arranged on the second frame carrier and a fourth magnetic attraction element arranged on the outer frame carrier and corresponding to the third magnetic attraction element, as so to force the second driving element to abut against the second frame carrier in a frictional contact manner through an magnetic attraction action between the third magnetic attraction element and the fourth magnetic attraction element.

16. The camera module according to claim 8, wherein the first prepressing component comprises a first magnetic attraction element arranged on the first frame carrier and a second magnetic attraction element arranged on the second frame carrier and corresponding to the first magnetic attraction element, as so to force the first driving element to abut against the first frame carrier in a frictional contact manner through an magnetic attraction action between the first magnetic attraction element and the second magnetic attraction element;

and the second prepressing component comprises a third magnetic attraction element arranged on the second frame carrier and a fourth magnetic attraction element arranged on the outer frame carrier and corresponding to the third magnetic attraction element, as so to force the first driving element to abut against the first frame carrier in a frictional contact manner through an magnetic attraction action between the first magnetic attraction element and the second magnetic attraction element.

17. The camera module according to claim 9, wherein the first prepressing component comprises a first magnetic attraction element arranged on the first frame carrier and a second magnetic attraction element arranged on the second frame carrier and corresponding to the first magnetic attraction element, as so to force the first driving element to abut against the first frame carrier in a frictional contact manner through an magnetic attraction action between the first magnetic attraction element and the second magnetic attraction element;

and the second prepressing component comprises a third magnetic attraction element arranged on the second frame carrier and a fourth magnetic attraction element arranged on the outer frame carrier and corresponding to the third magnetic attraction element, as so to force the second driving element to abut against the second frame carrier in a frictional contact manner through an magnetic attraction action between the third magnetic attraction element and the fourth magnetic attraction element.

* * * * *